(12) United States Patent
Awano

(10) Patent No.: US 9,815,656 B2
(45) Date of Patent: Nov. 14, 2017

(54) FOLD-ENHANCING DEVICE, POST-PRESSING APPARATUS EQUIPPED WITH FOLD-ENHANCING DEVICE, AND PROCESSING APPARATUS EQUIPPED WITH FOLD-ENHANCING DEVICE

(71) Applicant: FUJI XEROX CO., LTD., Tokyo (JP)

(72) Inventor: Hiroaki Awano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 223 days.

(21) Appl. No.: 14/724,064

(22) Filed: May 28, 2015

(65) Prior Publication Data

US 2016/0185564 A1 Jun. 30, 2016

(30) Foreign Application Priority Data

Dec. 25, 2014 (JP) ................................. 2014-262779

(51) Int. Cl.
| | | |
|---|---|---|
| *B65H 45/12* | (2006.01) | |
| *B29C 53/06* | (2006.01) | |
| *B65H 37/06* | (2006.01) | |
| *B65H 45/18* | (2006.01) | |

(52) U.S. Cl.
CPC ............ *B65H 45/12* (2013.01); *B29C 53/06* (2013.01); *B65H 37/06* (2013.01); *B65H 45/18* (2013.01); *B65H 2301/4213* (2013.01); *B65H 2301/42146* (2013.01); *B65H 2301/4505* (2013.01); *B65H 2301/51232* (2013.01); *B65H 2701/13212* (2013.01); *B65H 2801/27* (2013.01)

(58) Field of Classification Search
CPC ................ B65H 2801/27; B65H 45/12; B65H 2215/00877; B65H 37/06; B29C 53/06

USPC .......................................... 270/32, 45, 58.07
See application file for complete search history.

(56) References Cited

U.S. PATENT DOCUMENTS

| | | | | |
|---|---|---|---|---|
| 7,431,274 | B2 * | 10/2008 | Kushida et al. | ................ 270/37 |
| 7,673,862 | B2 * | 3/2010 | Kushida et al. | ................ 270/32 |
| 8,083,218 | B2 * | 12/2011 | Dobashi et al. | ................ 270/45 |
| 8,201,815 | B2 * | 6/2012 | Sasahara et al. | ................ 270/45 |

(Continued)

FOREIGN PATENT DOCUMENTS

| | | |
|---|---|---|
| CN | 101920869 A | 12/2010 |
| CN | 103662958 A | 3/2014 |

(Continued)

OTHER PUBLICATIONS

Communication dated Feb. 27, 2017, from the State Intellectual Property Office of the P.R.C., in counterpart Chinese application No. 201510397376.5.

*Primary Examiner* — Leslie A Nicholson, III
(74) *Attorney, Agent, or Firm* — Sughrue Mion, PLLC

(57) ABSTRACT

A fold-enhancing device includes a pressing member, at least one retaining member, and a moving mechanism. The pressing member presses against a fold line of a recording-medium bundle folded into a booklet shape. The recording-medium bundle is obtained by stacking multiple sheets of recording media. The retaining member retains the recording-medium bundle and is provided at a position located away from the fold line in a direction intersecting the fold line and not in contact with the pressing member. The moving mechanism moves the pressing member and the retaining member in a direction extending along the fold line.

20 Claims, 20 Drawing Sheets

(56) References Cited

U.S. PATENT DOCUMENTS

| | | | |
|---|---|---|---|
| 8,317,180 B2 * | 11/2012 | Kawaguchi | 270/37 |
| 8,459,630 B2 * | 6/2013 | Watanabe et al. | 270/45 |
| 8,500,111 B2 | 8/2013 | Terao | |

FOREIGN PATENT DOCUMENTS

| | | |
|---|---|---|
| JP | 2004-59304 A | 2/2004 |
| JP | 2012-153530 A | 8/2012 |
| JP | 2014-141347 A | 8/2014 |

* cited by examiner

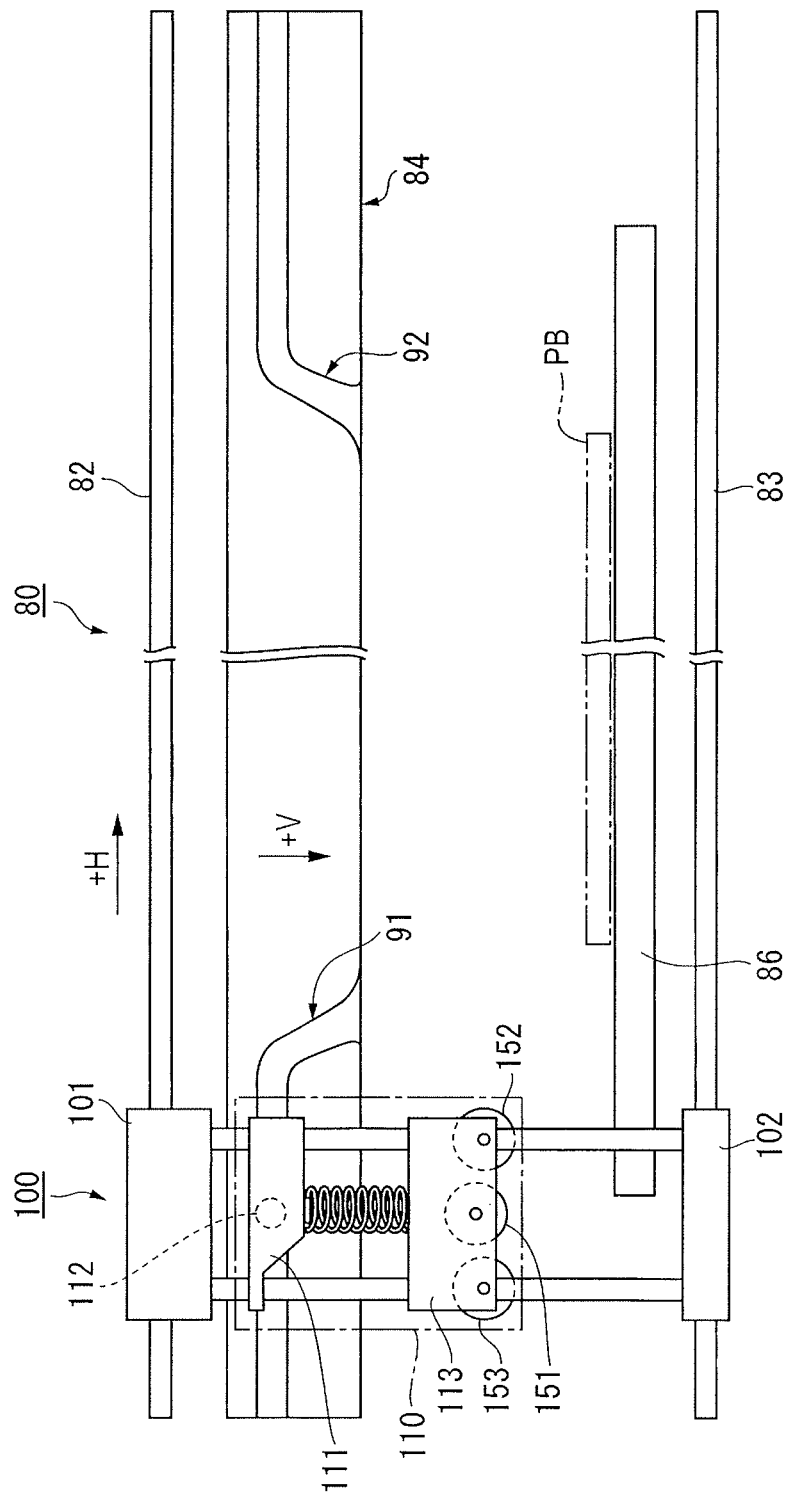

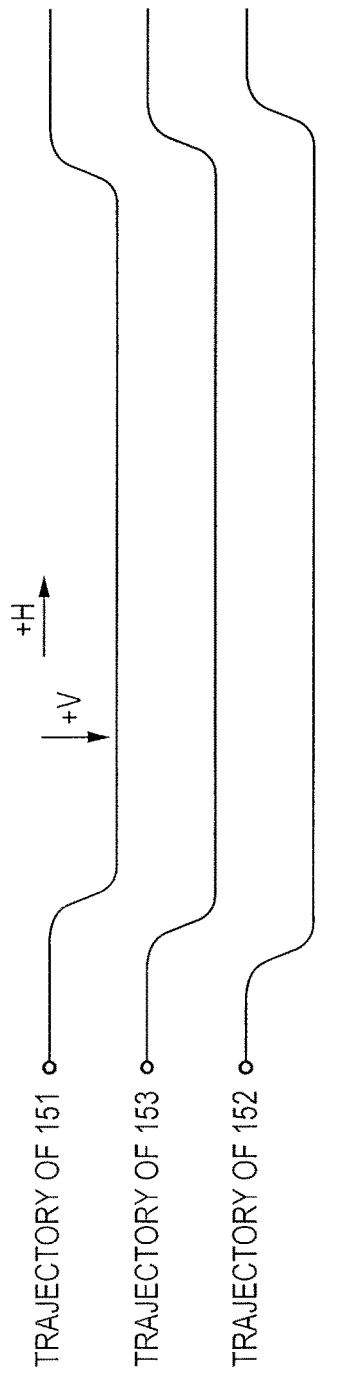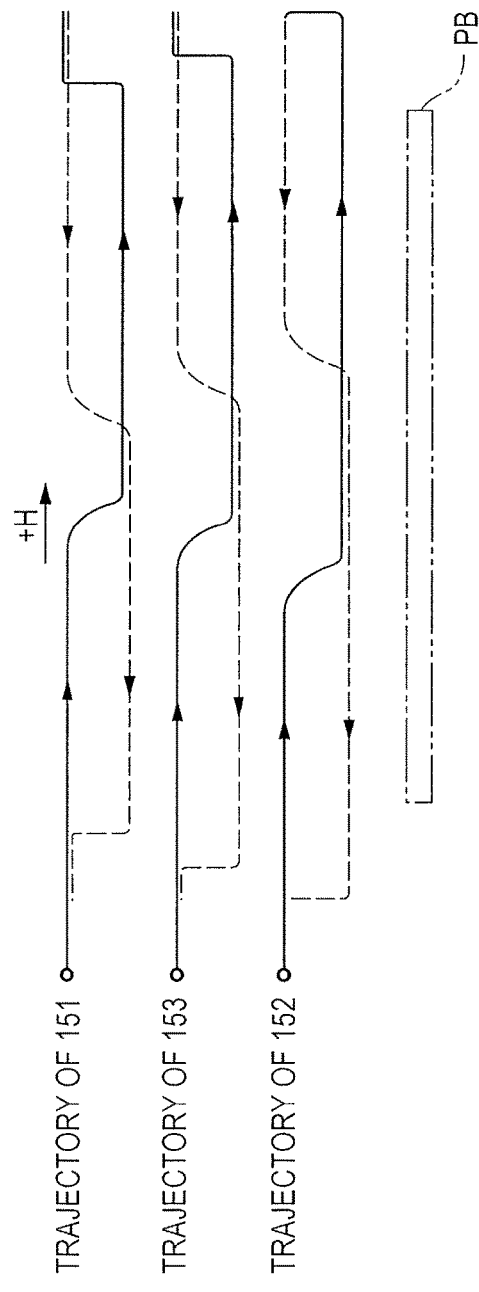

FOLD-ENHANCING DEVICE, POST-PRESSING APPARATUS EQUIPPED WITH FOLD-ENHANCING DEVICE, AND PROCESSING APPARATUS EQUIPPED WITH FOLD-ENHANCING DEVICE

CROSS-REFERENCE TO RELATED APPLICATIONS

This application is based on and claims priority under 35 USC 119 from Japanese Patent Application No. 2014-262779 filed Dec. 25, 2014.

BACKGROUND

Technical Field

The present invention relates to fold-enhancing devices, post-processing devices equipped with such fold-enhancing devices, and processing apparatuses equipped with such fold-enhancing devices.

SUMMARY

According to an aspect of the invention, there is provided a fold-enhancing device including a pressing member, at least one retaining member, and a moving mechanism. The pressing member presses against a fold line of a recording-medium bundle folded into a booklet shape. The recording-medium bundle is obtained by stacking multiple sheets of recording media. The retaining member retains the recording-medium bundle and is provided at a position located away from the fold line in a direction intersecting the fold line and not in contact with the pressing member. The moving mechanism moves the pressing member and the retaining member in a direction extending along the fold line.

BRIEF DESCRIPTION OF THE DRAWINGS

Exemplary embodiments of the present invention will be described in detail based on the following figures, wherein:

FIG. 15 illustrates a fold-enhancing mechanism according to a third exemplary embodiment;

FIGS. 19A and 19B illustrate the movement trajectories of the pressing roller and the retaining rollers in the fifth exemplary embodiment.

DETAILED DESCRIPTION

Exemplary Embodiment

Figure 1:
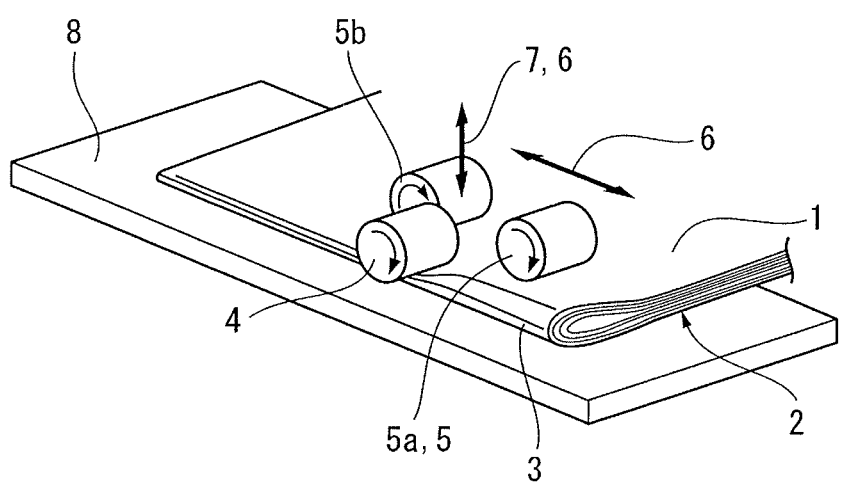
FIG. 1 schematically illustrates a fold-enhancing device according to an exemplary embodiment of the present invention.

FIG. 1 schematically illustrates a fold-enhancing device according to an exemplary embodiment of the present invention.

In FIG. 1, the fold-enhancing device basically includes a pressing member 4, at least one retaining member 5, and a moving mechanism 6. The pressing member 4 presses against a fold line 3 of a recording-medium bundle 2 folded into a booklet shape, which is obtained by stacking multiple sheets of recording media 1. The retaining member 5 is disposed away from the fold line 3 in a direction intersecting the fold line 3 and is disposed out of contact with the pressing member 4. The retaining member 5 retains the recording-medium bundle 2 in position. The moving mechanism 6 moves the pressing member 4 and the retaining member 5 in the direction extending along the fold line 3.

In this exemplary embodiment, the pressing member 4 may be of any appropriately selected type so long as it exhibits a pressing function, and the retaining member 5 may be of any appropriately selected type so long as it exhibits a retaining function. However, in order to achieve these pressing and retaining functions effectively, the pressing member 4 and the retaining member 5 may be rotating members.

The following description of the exemplary embodiment shown in FIG. 1 relates to a representative example in which rotating members are used as the pressing member 4 and the retaining member 5 and in which two retaining members 5 are provided.

Specifically, in the fold-enhancing device shown in FIG. 1, the pressing member 4 is disposed so as to cover the position of the fold line 3 of the recording-medium bundle 2 folded into a booklet shape, which is obtained by stacking multiple sheets of recording media 1, and applies pressure onto the fold line 3 while rotating in the direction extending along the fold line 3 so as to further press down on the fold line 3. The multiple retaining members 5 (5a and 5b) are disposed close to but out of contact with the fold line 3 in the direction intersecting the fold line 3 and are separated from each other in the direction extending along the fold line 3 with respect to the center of the pressing member 4. The retaining members 5 retain the recording-medium bundle 2 while rotating in the direction extending along the fold line 3. The moving mechanism 6 moves the pressing member 4 and the retaining members 5 in the direction extending along the fold line 3 while maintaining the relative positional relationship therebetween.

In this technology, the pressing member 4 and the retaining members 5 may at least be provided at one face of the recording-medium bundle 2. In the case where the pressing member 4 and the retaining members 5 are provided at one face of the recording-medium bundle 2, for example, a plate-shaped stationary member 8 as shown in FIG. 1 is provided at the reverse face of the recording-medium bundle 2 at a position facing the pressing member 4 and the retaining members 5. Although the pressing member 4 and the retaining members 5 may be of a freely rotatable type, for example, the retaining members 5 may alternatively be of a rotationally driven type. Furthermore, although the materials of the pressing member 4 and the retaining members 5 are not particularly limited, the surfaces thereof may be lined with rubber for obtaining a frictional force to a certain extent against the recording media 1.

With regard to the positions of the retaining members 5 relative to the pressing member 4, the retaining members 5 may be disposed close to but out of contact with the fold line 3 in the direction intersecting the fold line 3 and may be separated from each other in the direction extending along the fold line 3 with respect to the center of the pressing member 4. In the direction extending along the fold line 3, the retaining members 5 may be disposed astride the pressing member 4 or may be disposed so as to partially overlap the pressing member 4 instead of being disposed astride the pressing member 4. Although the number of retaining members 5 is not particularly limited, a configuration with two retaining members set as a pair is normally applied for simplifying the device configuration.

The moving mechanism 6 is not limited to a particular type so long as it moves the pressing member 4 and the retaining members 5 in the direction extending along the fold line 3 while maintaining the relative positional relationship therebetween. By employing such a moving mechanism 6, the pressing member 4 and the retaining members 5 are moved smoothly, thereby suppressing deformation of the recording-medium bundle 2 during the fold-enhancing process.

Figure 2A:
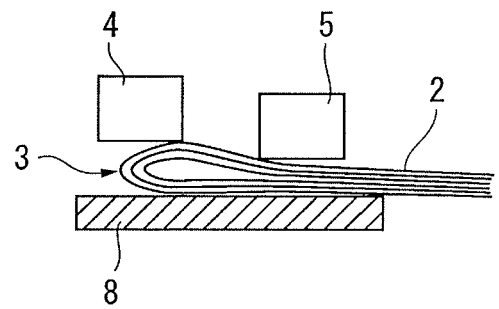
FIGS. 2A to 2C illustrate fold-enhancing operation performed using the fold-enhancing device according to the exemplary embodiment of the present invention.
Figure 2B:
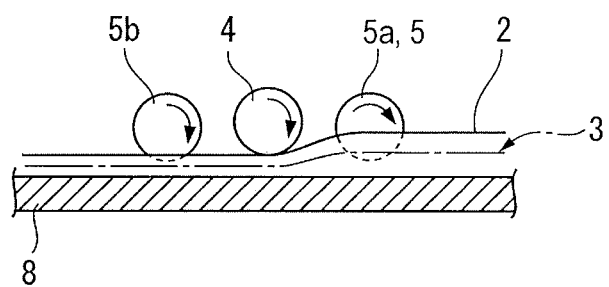
Figure 2C:
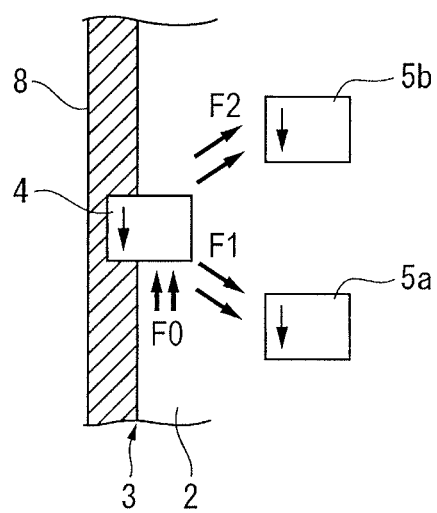
Figure 3A:
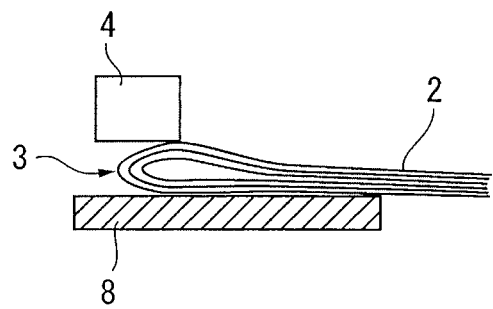
FIGS. 3A to 3C illustrate a comparative example in which fold-enhancing operation is performed using a configuration not equipped with retaining members according to an exemplary embodiment of the present invention.
Figure 3B:
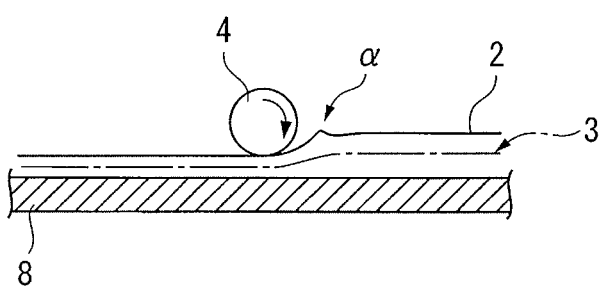
Figure 3C:
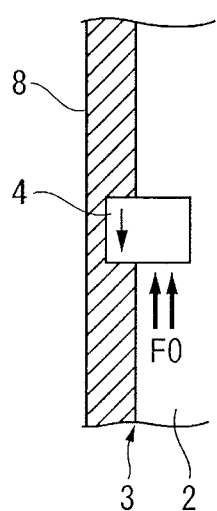

Next, the operation of the fold-enhancing device will be described with reference to FIGS. 2A to 3C. FIGS. 2A to 2C illustrate fold-enhancing operation performed using the fold-enhancing device according to the exemplary embodiment of the present invention. FIGS. 3A to 3C illustrate a comparative example in which fold-enhancing operation is performed using a configuration not equipped with the retaining members 5 according to the exemplary embodiment of the present invention. FIGS. 2A and 3A illustrate the fold line 3 as viewed from a lateral direction (i.e., up-down direction of the booklet), FIGS. 2B and 3B illustrate the fold line 3 when the spine of the booklet is viewed from the front, and FIGS. 2C and 3C illustrate the fold line 3 as viewed from above (i.e., toward the surface of the recording media 1 of the recording-medium bundle 2).

First, the comparative example shown in FIGS. 3A to 3C will be described. As shown in FIGS. 3A to 3C, when a fold-enhancing process is to be performed using the pressing member 4 alone, a tensile force F0 (i.e., a force that causes the surface of the recording-medium bundle 2 to be pulled toward the pressing member 4) acting parallel to the rotational direction of the pressing member 4 is applied to the recording-medium bundle 2 in the direction in which the pressing member 4 proceeds. Therefore, as the pressing member 4 rotates during the fold-enhancing process, a force that causes the surface of the recording-medium bundle 2 to be pulled toward the pressing member 4 particularly acts on the recording-medium bundle 2, thus causing large deformation α to easily occur in the recording-medium bundle 2, as shown in FIG. 3B. When such large deformation α occurs, the deformation α may possibly become entangled with the pressing member 4 during the fold-enhancing process, resulting in visible deformation, such as wrinkles, in the surface of the recording-medium bundle 2 after the fold-enhancing process.

In contrast, in the case where the retaining members 5 (5a and 5b) are provided, as shown in FIGS. 2A to 2C, since the surface of the recording-medium bundle 2 is retained by the retaining members 5, tensile forces F1 and F2 acting toward the retaining members 5 occur on the recording-medium bundle 2 in the vicinity of the pressing member 4. Therefore, in the direction in which the pressing member 4 proceeds during the fold-enhancing process, the tensile force F0 (i.e., the force that causes the surface of the recording-medium bundle 2 to be pulled toward the pressing member 4) acting parallel to the rotational direction of the pressing member 4 is minimized. As a result, the possibility of the recording-medium bundle 2 becoming entangled with the pressing member 4 may be reduced during the fold-enhancing process, so that the occurrence of the deformation α as shown in FIGS. 3A to 3C may be suppressed.

Next, the representative example of this exemplary embodiment will be further described with reference to FIG. 1.

The retaining members 5 (5a and 5b) may be separated from each other in the direction extending along the fold line 3 with respect to the center of the pressing member 4. In order to effectively utilize the retaining forces by the retaining members 5, the retaining members 5 may be arranged symmetrically with respect to the center of the pressing member 4 in the direction extending along the fold line 3. By symmetrically arranging the retaining members 5, the recording-medium bundle 2 is retained substantially uniformly in front of and behind the pressing member 4 in the direction extending along the fold line 3, so that the occurrence of the deformation α shown in FIGS. 3A to 3C may be suppressed.

Figure 4A:
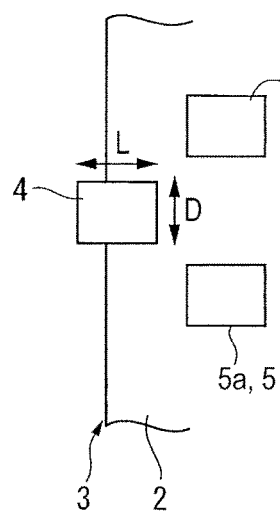
FIGS. 4A to 4C illustrate positional relationships between a pressing member and the retaining members.
Figure 4B:
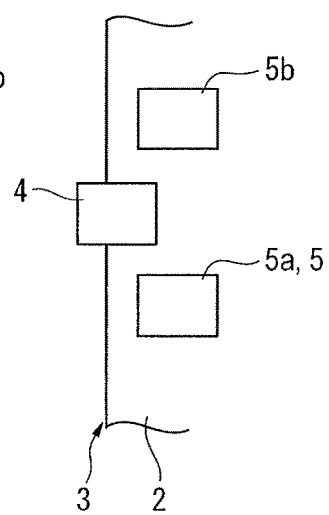
Figure 4C:
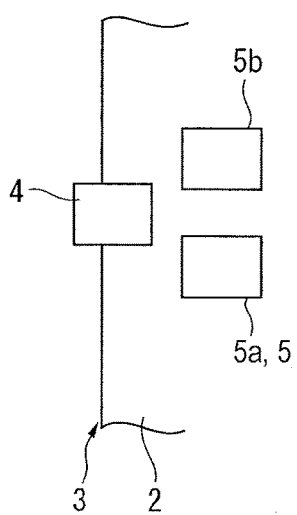

FIGS. 4A to 4C illustrate representative positional relationships between the pressing member 4, which is provided at the position corresponding to the fold line 3 of the recording-medium bundle 2, and the retaining members 5 (5a and 5b), which are separated from each other in the direction extending along the fold line 3 with respect to the center of the pressing member 4. Referring to FIG. 4A, in the direction extending along the fold line 3, the retaining members 5 are disposed such that the distance therebetween exceeds a diameter D of the pressing member 4. Moreover, in the direction intersecting the fold line 3, the retaining members 5 are disposed at positions located beyond a length L of the pressing member 4. Referring to FIG. 4B, in the direction extending along the fold line 3, the retaining members 5 are disposed such that the distance therebetween exceeds the diameter D of the pressing member 4. Moreover, in the direction intersecting the fold line 3, the retaining members 5 are partially disposed within the range of the length L of the pressing member 4. Referring to FIG. 4C, in the direction extending along the fold line 3, the retaining members 5 are partially disposed within the range of the diameter D of the pressing member 4. Moreover, in the direction intersecting the fold line 3, the retaining members 5 are disposed at positions located beyond the length L of the pressing member 4.

Although any one of the layouts shown in FIGS. 4A to 4C may be employed, it is better to set the ends of the retaining members 5 (5a and 5b) within, for example, about a 30-mm range from the position of the fold line 3 in the direction intersecting the fold line 3. Moreover, in the direction extending along the fold line 3, it is better to set the center of each of the retaining members 5 (5a and 5b) within, for example, about a 30-mm range from the center of the pressing member 4.

In order to perform the fold-enhancing operation on the fold line 3 of the recording-medium bundle 2 more effectively, it is better that pairs of pressing members 4 and retaining members 5 (5a and 5b) be provided symmetrically with the fold line 3 of the recording-medium bundle 2 interposed therebetween. By providing these pairs of pressing members 4 and retaining members 5 at opposite surfaces of the recording-medium bundle 2, a force point (i.e., a section corresponding to a nip region) by the two pressing members 4 may be concentrated, so that the fold line 3 that has effectively received the fold-enhancing effect may be formed. Furthermore, in order to further intensify the function of the retaining members 5 during the fold-enhancing process, the pressing members 4 may press against the recording-medium bundle 2 at a position closer thereto than the retaining members 5 in the thickness direction of the recording-medium bundle 2. This implies that the amount by which the retaining members 5 nip the recording-medium bundle 2 is smaller than that of the pressing members 4. In this case, in the thickness direction of the recording-medium bundle 2, the pressing members 4 and the retaining members 5 may be positionally changed relative to each other or the pressure applied for biasing the pressing members 4 and the retaining members 5 may be individually changed.

In order to make the functions of the pressing members 4 and the retaining members 5 more stable, the moving mechanism 6 may have a contact-noncontact mechanism 7 that moves the pressing members 4 and the retaining members 5 into contact with and away from the recording-medium bundle 2 in the thickness direction of the recording-medium bundle 2. The contact-noncontact mechanism 7 may integrally move the pressing members 4 and the retaining members 5. Moreover, when bringing the pressing members 4 and the retaining members 5 into contact with the recording-medium bundle 2, the contact-noncontact mechanism 7 may be configured to move the retaining members 5 to positions where a nipping dimension with which they nip the recording-medium bundle 2 is smaller than a nipping dimension with which the pressing members 4 nip the recording-medium bundle 2.

Furthermore, the following configuration is also possible. Specifically, the moving mechanism 6 may have a contact-noncontact mechanism 7 that moves the pressing members 4 and the retaining members 5 into contact with and away from the recording-medium bundle 2 in the thickness direction of the recording-medium bundle 2. In this case, when bringing the pressing members 4 and the retaining members 5 into contact with the recording-medium bundle 2, the contact-noncontact mechanism 7 may be configured to bring the retaining members 5 into contact with the recording-medium bundle 2 prior to the pressing members 4. When moving the pressing members 4 and the retaining members 5 away from the recording-medium bundle 2, the contact-noncontact mechanism 7 may be configured to move the pressing members 4 away from the recording-medium bundle 2 prior to the retaining members 5. Accordingly, when the pressing members 4 and the retaining members 5 come into contact with recording-medium bundle 2, the retaining members 5 come into contact with the recording-medium bundle 2 first, and the fold-enhancing process is subsequently performed by the pressing members 4. When the pressing members 4 and the retaining members 5 move away from the recording-medium bundle 2, the pressing members 4 move away from the recording-medium bundle 2 first in a state where the recording-medium bundle 2 is retained by the retaining members 5, whereby deformation in and near the fold line 3 may be suppressed during the fold-enhancing process.

Furthermore, as another example of the moving mechanism 6, the moving mechanism 6 may use the contact-noncontact mechanism 7 to bring the pressing members 4 and the retaining members 5 into contact with a central region of the recording-medium bundle 2 in the direction extending along the fold line 3, may then move the pressing members 4 and the retaining members 5 toward one end of the fold line 3 in the direction extending along the fold line 3, may subsequently set the pressing members 4 and the retaining members 5 in a noncontact state by using the contact-noncontact mechanism 7 and return the pressing members 4 and the retaining members 5 to the central region, and may then set the pressing members 4 and the retaining members 5 in a contact state by using the contact-noncontact mechanism 7 and move the pressing members 4 and the retaining members 5 toward the other end of the recording-medium bundle 2. In this case, the pressing members 4 and the retaining members 5 come into contact with the recording-medium bundle 2 also at the start of the fold-enhancing process.

Furthermore, the following configuration is also possible. Specifically, the moving mechanism 6 may use the contact-noncontact mechanism 7 to bring the pressing members 4 and the retaining members 5 into contact with one end of the recording-medium bundle 2 in the direction extending along the fold line 3, may move the pressing members 4 and the retaining members 5 in the contact state toward the other end, and may then use the contact-noncontact mechanism 7 to dispose the pressing members 4 and the retaining members 5 out of contact with the recording-medium bundle 2. In this case, the fold-enhancing operation is performed on the recording-medium bundle 2 by moving the pressing member 4 and the retaining members 5 in one direction.

In order to realize a post-processing device equipped with such a fold-enhancing device, the post-processing device may include a folding mechanism, which stacks multiple sheets of image-recordable recording media 1 and folds the multiple sheets of recording media 1 into a booklet shape, and the aforementioned fold-enhancing device.

Furthermore, in order to realize a processing apparatus equipped with such a post-processing device, the processing apparatus may include an image forming unit, which forms images onto image-recordable recording media 1, and the aforementioned post-processing device. Moreover, the processing apparatus may have the following configuration. Specifically, the processing apparatus may include an image forming unit, which forms images onto image-recordable recording media 1, a folding mechanism, which stacks the multiple sheets of recording media 1 having the images formed thereon by the image forming unit and folds the multiple sheets of recording media 1 into a booklet shape, and the aforementioned fold-enhancing device.

Exemplary embodiments of the present invention will be described in further detail below with reference to the appended drawings.

First Exemplary Embodiment

Overall Configuration of Processing Apparatus

Figure 5:
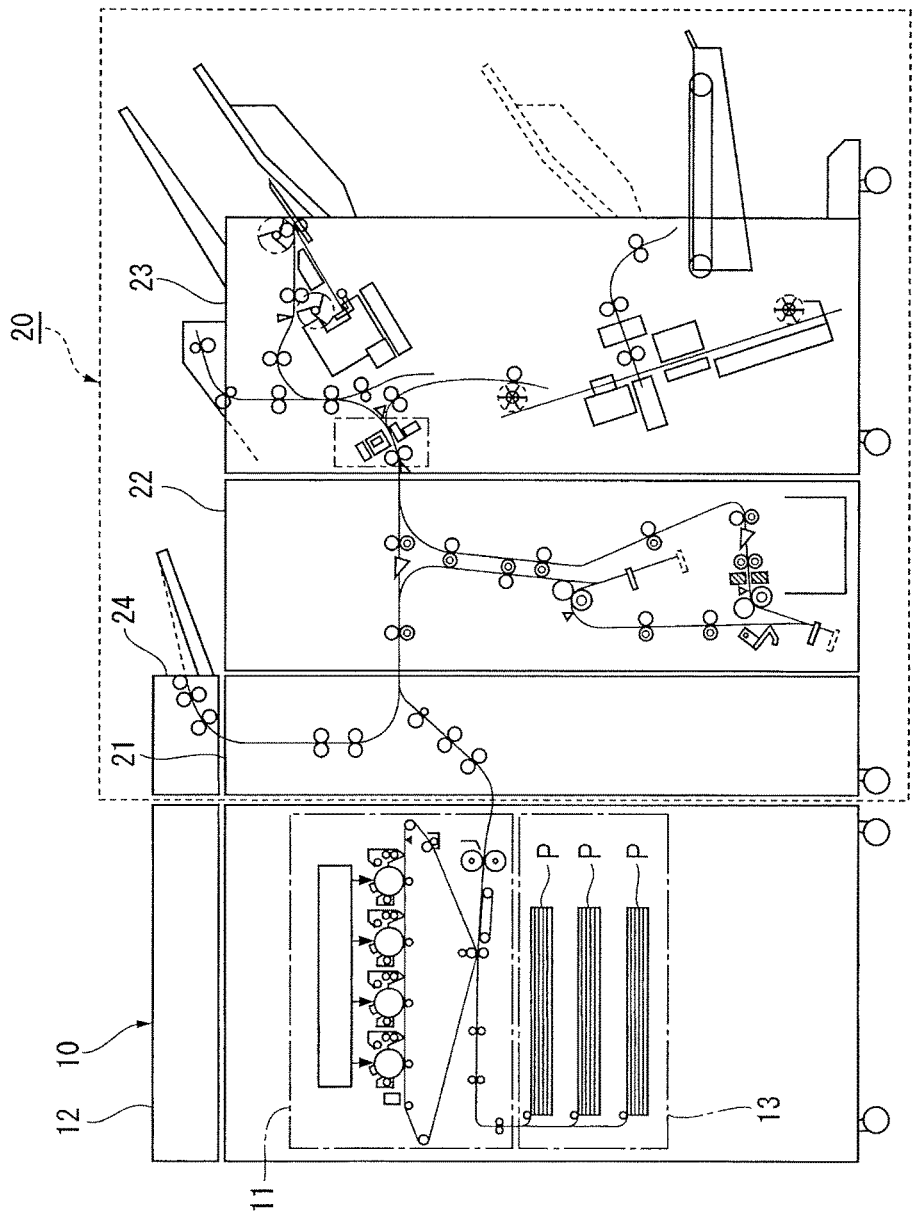
FIG. 5 illustrates the overall configuration of a processing apparatus according to a first exemplary embodiment.

FIG. 5 illustrates the overall configuration of a processing apparatus according to a first exemplary embodiment of the present invention. In FIG. 5, the processing apparatus according to the first exemplary embodiment includes an image forming device 10, which forms an image onto a recording medium, and a post-processing device 20, which performs, for example, a binding process and a folding process as post-processing on the recording medium having the image formed thereon by the image forming device 10.

Configuration of Image Forming Device

The image forming device 10 includes an image forming unit 11 that forms images based on image data of respective colors, an image reading unit 12 that reads an image from a document so as to generate read image data, and a recording-medium feeding unit 13 that feeds a recording medium P to the image forming unit 11. The image forming unit 11 according to this exemplary embodiment forms toner images of four colors, transfers the toner images in a superimposed manner onto an intermediate transfer belt, and then collectively transfers the superimposed image onto the recording medium P fed from the recording-medium feeding unit 13. The recording medium P having the image collectively transferred thereon undergoes a fixing process and is then transported to the post-processing device 20 located downstream. Although an electrophotographic method is described here as an image forming method, other known methods may be employed so long as an image is formable on the recording medium P.

Overall Configuration of Post-Processing Device

The post-processing device 20 according to this exemplary embodiment includes, for example, a transport unit 21 that receives and transports the recording medium P having the image formed thereon from the image forming device 10, a folding unit 22 that performs a folding process on the recording medium P transported from the transport unit 21, a finisher unit 23 that performs a finishing process on the recording medium P that has passed through the folding unit 22, and an interposer 24 that feeds a slip sheet to be used as, for example, a cover of a booklet. Although the post-processing device 20 includes the transport unit 21, the folding unit 22, the finisher unit 23, and the interposer 24 in this exemplary embodiment, the post-processing device 20 may alternatively include, for example, the finisher unit 23 alone.

Figure 6:
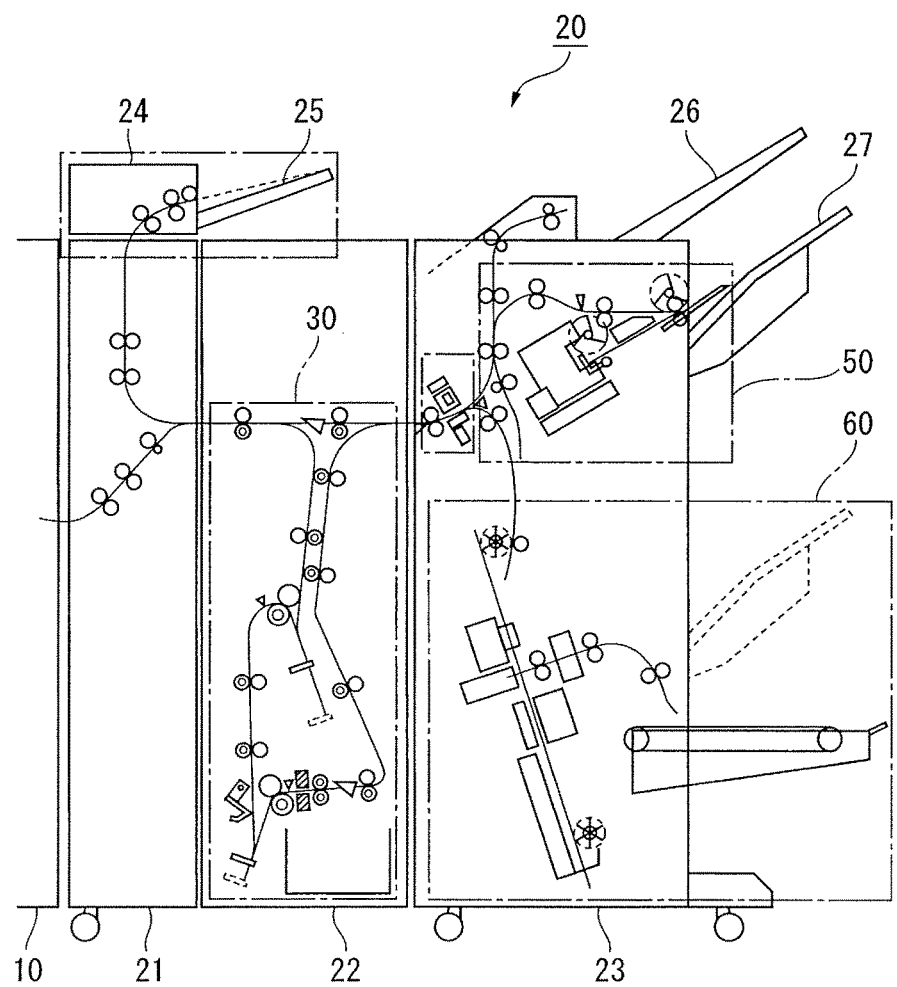
FIG. 6 illustrates the configuration of a post-processing device.

FIG. 6 illustrates the post-processing device 20 in more detail. The interposer 24 in the post-processing device 20 according to this exemplary embodiment includes a feeder 25 that feeds a slip sheet, such as thick paper, to be used as a cover when making recording media into a booklet. Therefore, the recording medium P from the image forming device 10 and the slip sheet from the interposer 24 are appropriately transported via the transport unit 21 to the folding unit 22 located downstream. Moreover, the folding unit 22 includes a specialized folding mechanism 30 that performs a folding process, such as an inward threefold process (i.e., a C-fold process) or an outward threefold process (i.e., a Z-fold process), on a recording medium. The recording medium from the folding unit 22 is then guided to the finisher unit 23. The specialized folding mechanism 30 of the folding unit 22 does not always perform the process on a recording medium output from the image forming device 10, and may perform the process where appropriate.

Moreover, with regard to the feeding of a slip sheet from the interposer 24, the feeding may be performed where appropriate.

Configuration of Finisher Unit

Figure 7:
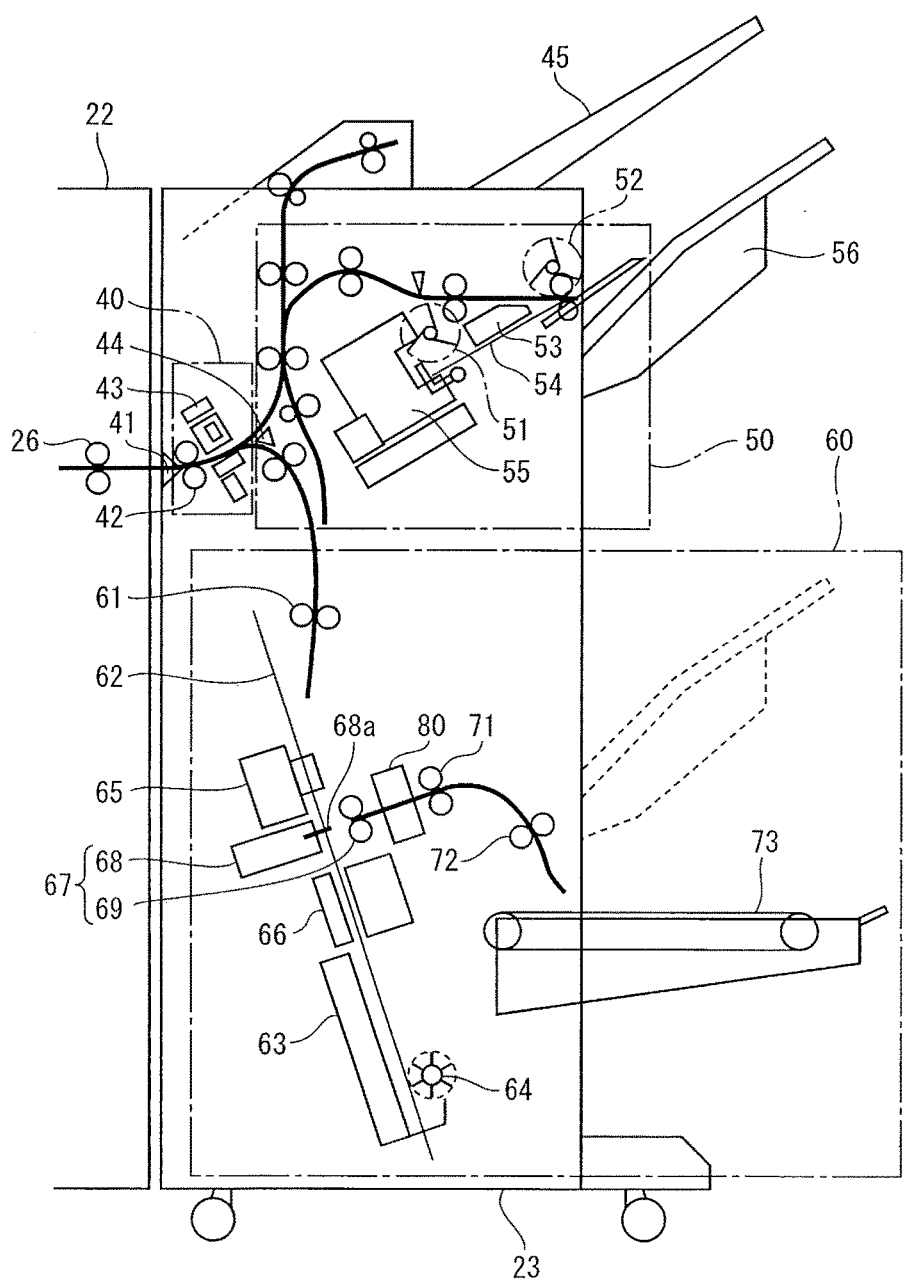
FIG. 7 illustrates the configuration of a finisher unit.

FIG. 7 illustrates the finisher unit 23.

The finisher unit 23 according to this exemplary embodiment includes a hole-punching unit 40 that performs a hole-punching process on a recording medium, an edge-binding unit 50 that forms a recording-medium bundle by stacking a predetermined number of sheets of recording media and that performs an edge-binding process (i.e., stapling process) on an edge of the recording-medium bundle, and a booklet forming unit 60 that forms a recording-medium bundle by stacking a predetermined number of sheets of recording media and forms a booklet by performing, for example, a saddle-stitch binding process on a central portion of this recording-medium bundle.

The hole-punching unit 40 is provided with, for example, an entrance 41 through which a recording medium output from an output roller 26 in the folding unit 22 enters, a transport roller 42 that transports the recording medium entering through the entrance 41, a hole-punching mechanism 43 that performs a hole-punching process on the recording medium transported from the transport roller 42, and a switching unit 44 that switches the transport destination of the recording medium, which has passed through the hole-punching mechanism 43, to the edge-binding unit 50 or the booklet forming unit 60. Reference character 45 denotes an output load section to which the recording medium that has passed through the hole-punching unit 40 is directly output and loaded.

The edge-binding unit 50 is provided with an edge-binding mechanism 55 that uses, for example, paddles 51 and 52, which are bladed rotating members, and a pounding member 53 to stack and align a predetermined number of sheets of recording media transported on a compile tray 54 and that performs an edge-binding process on the aligned recording-medium bundle. Furthermore, the recording-medium bundle that has undergone the edge-binding process performed by the edge-binding mechanism 55 is loaded onto an output load section 56 provided at the right side in FIG. 7. The output load section 56 according to this exemplary embodiment is capable of selectively accommodating recording-medium bundles in the direction intersecting the output direction thereof and is also capable of automatically moving downward as the number of output edge-bound recording-medium bundles increases.

Furthermore, the entrance of the booklet forming unit 60 is provided with a transport roller 61 that transports recording media, which have passed through the hole-punching unit 40, one-by-one onto a compile tray 62. The compile tray 62 is disposed in an inclined state for stacking thereon and aligning a predetermined number of sheets of recording media transported by the transport roller 61. The lower end (i.e., lower end in FIG. 7) of the compile tray 62 is provided with an end guide 63 for positionally setting the lower edge of the recording-medium bundle at a predetermined position. The end guide 63 is movable in the vertical direction. Furthermore, a paddle 64 for aligning the lower edges of the recording media on the compile tray 62 is provided near the end guide 63.

The upper end of the compile tray 62 is provided with an aligning mechanism 65 that taps on the widthwise edges of the recording media to be aligned by the compile tray 62 so as to align the widthwise edges. The compile tray 62 also includes a saddle-stitch binding mechanism 66 that performs a saddle-stitch binding process on the aligned recording-medium bundle, and a folding mechanism 67 as a folding device that folds the aligned recording-medium bundle into a booklet shape. The folding mechanism 67 includes a folder-knife moving mechanism 68 that causes a folder knife 68a, which is used for folding the aligned recording-medium bundle, to advance to and recede from the recording-medium bundle, and a folder roller 69 that forms a fold line in the recording-medium bundle folded by the advanced folder knife 68a.

Furthermore, in this exemplary embodiment, a fold-enhancing mechanism 80 is provided as a fold-enhancing device that further applies pressure onto the fold line of the booklet-shaped recording-medium bundle that has passed through the folder roller 69 so as to form a firm fold line. The booklet that has passed through the fold-enhancing mechanism 80 is then output via a transport roller 71 and an output roller 72 to a booklet load section 73 onto which the booklet-shaped recording-medium bundle is loaded.

Configuration of Fold-Enhancing Mechanism

Next, the fold-enhancing mechanism 80 according to this exemplary embodiment will be described in detail.

Figure 8:
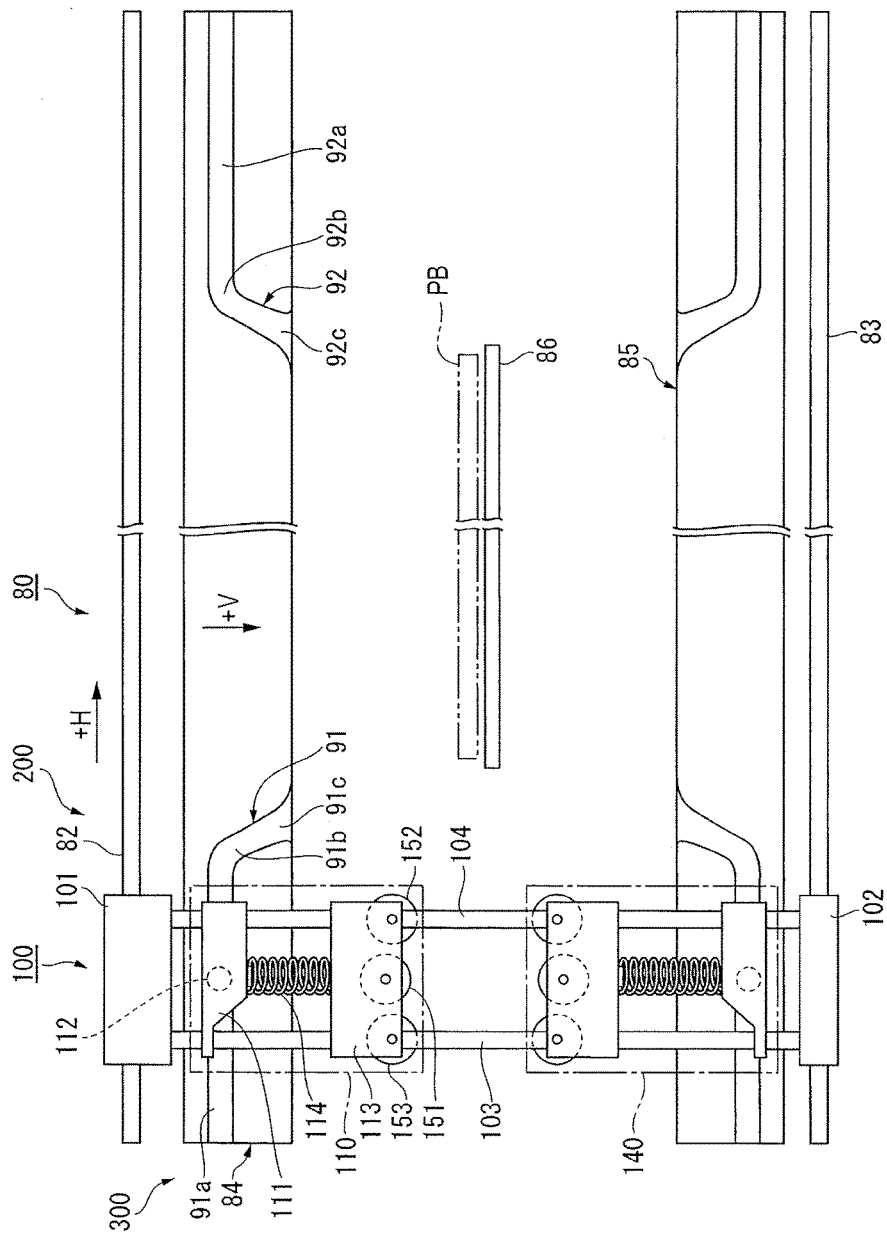
FIG. 8 schematically illustrates the configuration of a fold-enhancing mechanism.

As shown in FIG. 8, the fold-enhancing mechanism 80 according to this exemplary embodiment includes a pressing module 100 that operates in a direction (i.e., ±V direction in FIG. 8) intersecting a fold line of a recording-medium bundle PB folded into a booklet shape by the folding mechanism 67 (see FIG. 7) so as to further apply pressure onto the fold line of the recording-medium bundle PB, and a moving mechanism 200 that extends in a direction (i.e., a ±H direction in FIG. 8) parallel to the fold line of the recording-medium bundle PB.

Pressing Module

Figure 9:
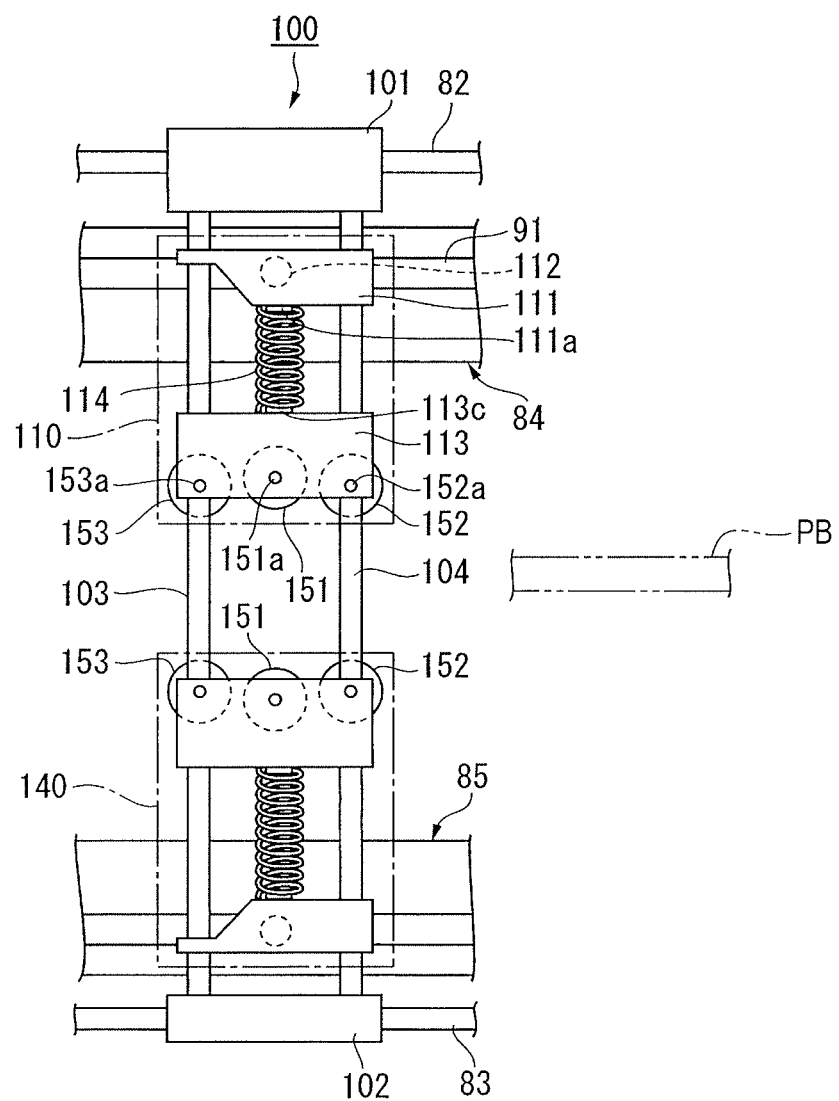
FIG. 9 is a front view of a pressing module.
Figure 10:
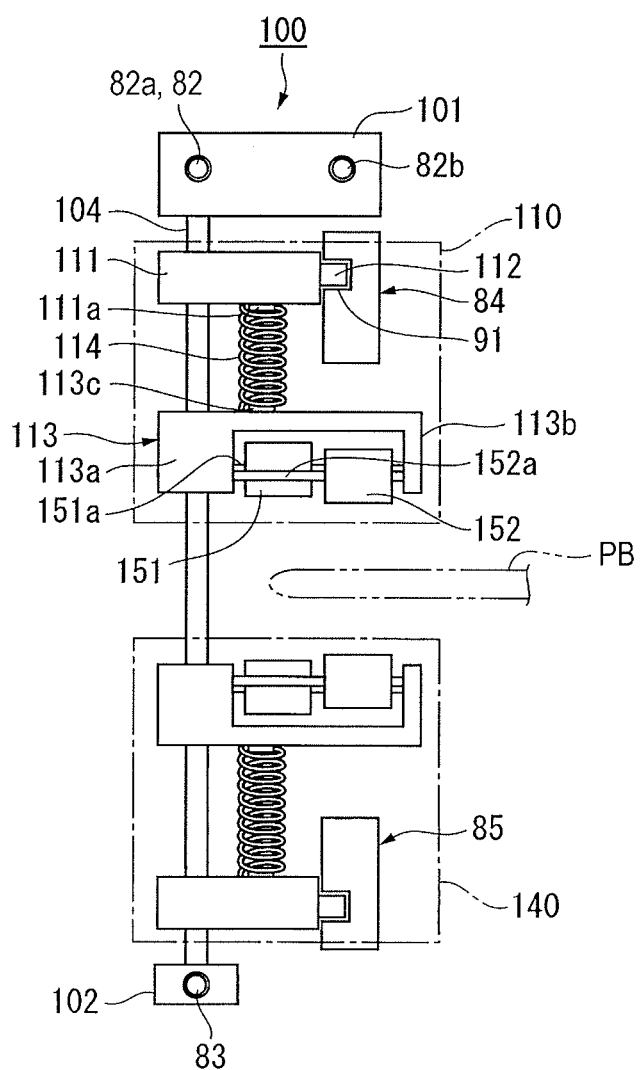
FIG. 10 is a side view of the pressing module.

The pressing module 100 will now be described with reference to FIGS. 9 and 10. FIG. 9 is a front view of the pressing module 100 (as viewed toward the spine of the recording-medium bundle PB), and FIG. 10 is a side view of FIG. 9 (as viewed in the up-down direction of the recording-medium bundle PB folded into a booklet shape). The pressing module 100 includes an upper pressing mechanism 110 that presses against the fold line of the recording-medium bundle PB from above, and a lower pressing mechanism 140 that presses against the fold line of the recording-medium bundle PB from below. In this exemplary embodiment, since the upper pressing mechanism 110 and the lower pressing mechanism 140 are substantially symmetrical in the ±V direction, the upper pressing mechanism 110 will be described below.

The upper pressing mechanism 110 includes a guide holder 111 and a roller holder 113 that are separated from each other in the vertical direction and that are supported slidably along two connection rods 103 and 104, which are components of the moving mechanism 200 to be described later.

The guide holder 111 according to this exemplary embodiment has different contact regions relative to the two connection rods 103 and 104 and is formed such that the slide resistance is low when the guide holder 111 moves along the connection rods 103 and 104. The guide holder 111 is provided with a guide pin 112 that protrudes toward the far side in FIG. 9.

The roller holder 113 is substantially U-shaped in cross section. Of two protrusions 113a and 113b of the roller holder 113, the protrusion 113a is supported by the connection rods 103 and 104. Between these two protrusions 113a and 113b, three rollers are rotatably supported by three shafts 151a, 152a, and 153a, respectively. Specifically, these three rollers include a pressing roller 151 as a pressing member that presses against the fold line of the recording-medium bundle PB folded into a booklet shape, and retaining rollers 152 and 153 as retaining members disposed at opposite sides of the pressing roller 151 in the direction extending along the fold line.

Furthermore, a spring 114 whose opposite ends are respectively fixed to the guide holder 111 and the roller holder 113 is provided therebetween. Therefore, the surface of the guide holder 111 facing the roller holder 113 is provided with a protrusion 111a for positioning the spring 114, and the surface of the roller holder 113 facing the guide holder 111 is provided with a protrusion 113c for positioning the spring 114.

The three rollers 151 to 153 in this exemplary embodiment are arranged as follows. In the thickness direction of the recording-medium bundle PB, the retaining rollers 152 and 153 are set to be lower (i.e., positions where a nipping dimension with which the retaining rollers 152 and 153 nip the recording-medium bundle PB is smaller) than the pressing roller 151. Moreover, the retaining rollers 152 and 153 are located toward the far side (i.e., in a direction extending away from the connection rods 103 and 104) relative to the pressing roller 151. Furthermore, the pressing roller 151 and the retaining rollers 152 and 153 are all constituted of rubber rollers. In this exemplary embodiment, the retaining rollers 152 and 153 are composed of a material with lower hardness than that of the pressing roller 151 so as to be more easily sinkable into the recording-medium bundle PB.

Moving Mechanism

As shown in FIG. 8, in order to move the pressing module 100 in the ±H direction, the moving mechanism 200 includes an upper support rod 82 and a lower support rod 83 that extend in the direction extending along the fold line of the recording-medium bundle PB folded into a booklet shape, an upper slider 101 that is provided within the pressing module 100 and is movable along the upper support rod 82, a lower slider 102 that is movable along the lower support rod 83, and the two connection rods 103 and 104 that integrally connect the upper slider 101 and the lower slider 102.

The opposite ends of the upper support rod 82 in the extending direction thereof are rotatably supported by, for example, bearings (not shown), and the upper support rod 82 is rotatable in forward and reverse directions by, for example, a motor (not shown). Furthermore, the upper support rod 82 has the shape of a threaded shaft provided with a helical thread groove in the longitudinal direction. In contrast, the lower support rod 83 is a round rod not having a thread groove and whose opposite ends are fixed. In this exemplary embodiment, the upper support rod 82 includes two support rods (82a and 82b), which will be described later (with reference to FIG. 10), and only one of the two support rods is provided with a thread groove. Alternatively, the upper support rod 82a may have a single-rod configuration.

The upper slider 101 has a nut configuration engaged with the thread groove of the upper support rod 82. By rotating the upper support rod 82 using, for example, the motor (not shown), the upper slider 101 is movable along the upper support rod 82. The lower slider 102 is movable along the lower support rod 83.

In this exemplary embodiment, the moving mechanism 200 includes a contact-noncontact mechanism 300 that moves the upper pressing mechanism 110 and the lower pressing mechanism 140 in the ±V direction so as to bring the upper pressing mechanism 110 and the lower pressing mechanism 140 into contact with and away from the recording-medium bundle PB. The contact-noncontact mechanism 300 includes an upper cam 84 corresponding to the upper pressing mechanism 110 and a lower cam 85 corresponding to the lower pressing mechanism 140. The upper cam 84 and the lower cam 85 are provided between the upper support rod 82 and the lower support rod 83 and extend in the direction extending along the fold line of the recording-medium bundle PB.

The upper cam 84 and the lower cam 85 have identical configurations and are arranged as a pair with vertically-inverted orientations. Therefore, the upper cam 84 will be described in detail here. The upper cam 84 has guide grooves 91 and 92 with substantially symmetrical shapes in the ±H direction. The guide grooves 91 and 92 respectively include linear portions 91a and 92a extending linearly from opposite longitudinal ends of the upper cam 84, curve portions 91b and 92b curving toward the recording-medium bundle PB (in the ±V direction) from the linear portions 91a and 92a, and ends 91c and 92c extending toward the lower end surface of the upper cam 84 (i.e., the surface thereof at the recording-medium bundle PB side) from the curve portions 91b and 92b.

The linear portions 91a and 92a and the curve portions 91b and 92b each have a groove width slightly larger than the outer diameter of the guide pin 112 (see FIG. 10) provided in the guide holder 111 of the upper pressing mechanism 110, such that the guide pin 112 is smoothly movable along the guide grooves 91 and 92. The ends 91c and 92c have shapes formed by curve lines smoothly curving toward the middle of the upper cam 84 in the longitudinal direction thereof and by curve lines extending along the extension lines of the curve portions 91b and 92b. In this exemplary embodiment, the recording-medium bundle PB is to be disposed within a region between these two guide grooves 91 and 92. The shapes of the guide grooves 91 and 92 are not limited to the above and may be other alternative shapes that allow the guide pin 112 to move smoothly along the guide grooves 91 and 92.

In other words, the contact-noncontact mechanism 300 according to this exemplary embodiment is achieved by the combination of the movement of the moving mechanism 200 in the ±H direction and the guide pin 112 provided in the guide holder 111 of the upper pressing mechanism 110 (although the upper pressing mechanism 110 is representatively described here, the same applies to the lower pressing mechanism 140).

Furthermore, reference character 86 denotes a support base that supports the recording-medium bundle PB to maintain its transport orientation during the fold-enhancing process. Such a support base 86 may be omitted if the transport orientation of the recording-medium bundle PB is stable before and after the fold-enhancing process.

Operation in Finisher Unit

As shown in FIG. 7, in the finisher unit 23 according to this exemplary embodiment, if a hole-punching process is to be performed on recording media transported through the entrance 41 of the hole-punching unit 40, the hole-punching process is performed on each sheet of recording medium at a predetermined timing. The recording medium that has passed through the hole-punching unit 40 is introduced to a predetermined transport path by the switching unit 44 and is directly output to the output load section 45 or is transported to the edge-binding unit 50 or the booklet forming unit 60.

In the edge-binding unit 50, a recording-medium bundle aligned on the compile tray 54 undergoes an edge-binding process performed by the edge-binding mechanism 55 and is output to the output load section 56.

In the booklet forming unit 60, a predetermined number of sheets of transported recording media are stacked and aligned on the compile tray 62. The recording-medium bundle aligned on the compile tray 62 undergoes a saddle-stitch binding process performed by the saddle-stitch binding mechanism 66. By moving the end guide 63, the saddle-stitched position of the recording-medium bundle is positionally set to a position corresponding to the folding mechanism 67. In the folding mechanism 67, the folder-knife moving mechanism 68 causes the folder knife 68a to advance from the compile tray 62 toward the folder roller 69 so that the recording-medium bundle is pushed out toward the folder roller 69 with the saddle-stitched position as the leading edge. In a state where a fold line is formed on the recording-medium bundle while the recording-medium bundle is nipped by the folder roller 69, the recording-medium bundle is transported downstream. Subsequently, in a state where the fold line is made firm by the fold-enhancing mechanism 80, the recording-medium bundle is output to the booklet load section 73. Although the above description relates to a configuration in which the saddle-stitch binding mechanism 66 preliminarily performs the saddle-stitch binding process on the recording-medium bundle that is to subsequently undergo a fold-line forming process by the folding mechanism 67, the fold-line forming process may be performed without performing the saddle-stitch binding process.

Operation in Fold-Enhancing Mechanism

Figure 11:
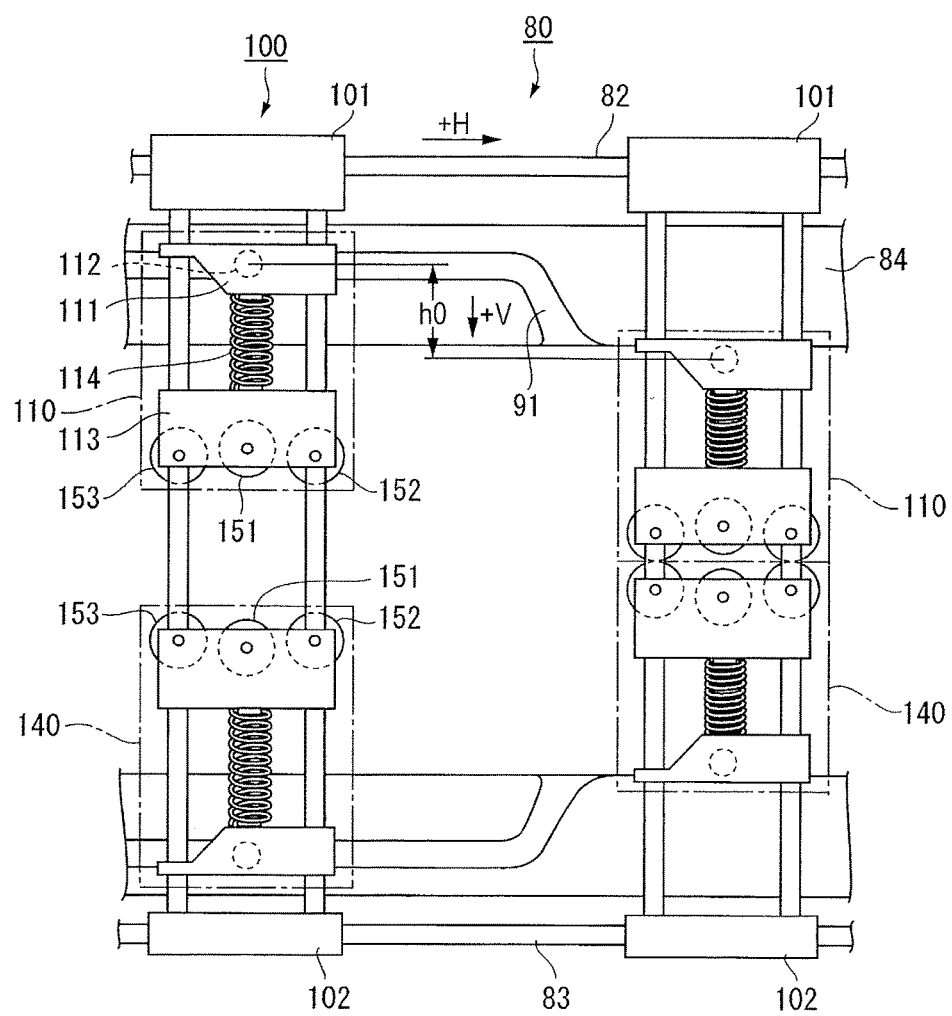
FIG. 11 illustrates how the pressing module in the fold-enhancing mechanism according to the first exemplary embodiment changes.

FIG. 11 specifically illustrates how the pressing module 100 changes in the operation in the fold-enhancing mechanism 80 according to this exemplary embodiment. Specifically, FIG. 11 illustrates how the pressing module 100 changes when the upper slider 101 is moved in the +H direction by the upper support rod 82. Since the upper pressing mechanism 110 and the lower pressing mechanism 140 have identical configurations, only the upper pressing mechanism 110 will be described here.

First, when the pressing module 100 is set at the left position (i.e., standby position), since the guide pin 112 is positioned by the guide groove 91 of the upper cam 84, the guide holder 111 is set at an upper position. In this case, because the roller holder 113 is pulled upward toward the guide holder 111 by the elasticity of the spring 114, the pressing roller 151 and the retaining rollers 152 and 153 of the upper pressing mechanism 110 and the pressing roller 151 and the retaining rollers 152 and 153 of the lower pressing mechanism 140 are maintained in a noncontact state.

Subsequently, when the upper slider 101 moves in the +H direction, the guide pin 112 gradually moves in the +V direction along the guide groove 91 of the upper cam 84. As shown in FIG. 11, when the guide pin 112 reaches the lower end surface of the upper cam 84, the guide holder 111 has moved by a distance h0 in the +V direction. As a result, the roller holder 113 is also pushed downward (in the +V direction) due to the elasticity of the spring 114. In this case, since the lower pressing mechanism 140 also operates in a similar manner, the pressing rollers 151 and the retaining rollers 152 and 153 of the upper pressing mechanism 110 and the lower pressing mechanism 140 nip the recording-medium bundle PB with certain pressure, owing also to the elasticity of the spring of the lower pressing mechanism 140. At this time, a fold-enhancing effect is applied onto the recording-medium bundle PB.

In other words, as shown in FIG. 11, when the upper slider 101 moves in the +H direction along the upper support rod 82, the roller holder 113 moves in the +H direction while the guide pin 112 of the upper pressing mechanism 110 is located in the linear portion 91a (see FIG. 8) of the guide groove 91 in the upper cam 84. When the guide pin 112 travels through the curve portion 91b (see FIG. 8) of the guide groove 91, the roller holder 113 travels in the +H direction and the +V direction. When the guide pin 112 exits the end 91c (see FIG. 8) of the guide groove 91, the roller holder 113 further travels in the +H direction from a position where the roller holder 113 has descended in the +V direction. As a result, the pressing rollers 151 and the retaining rollers 152 and 153 of the upper pressing mechanism 110 and the lower pressing mechanism 140 come into contact with the recording-medium bundle PB. At this time, a fold-enhancing effect is applied onto the fold line of the recording-medium bundle PB.

Then, while the guide pin 112 continues to move along the lower end surface of the upper cam 84, the fold-enhancing operation continues. When the guide pin 112 reaches the end 92c (see FIG. 8) of the guide groove 92, the roller holder 113 begins to move in the −V direction and then gradually moves further in the −V direction along the guide groove 92. As a result, the pressing rollers 151 and the retaining rollers 152 and 153 of the upper pressing mechanism 110 and the lower pressing mechanism 140 move away from the recording-medium bundle PB. In other words, the moving mechanism 200 (see FIG. 8) according to this exemplary embodiment operates in conjunction with the contact-noncontact mechanism 300 (see FIG. 8) and moves the upper slider 101 in the ±H direction so as to move the guide pin 112 along the guide grooves 91 and 92 of the upper cam 84. Thus, the upper pressing mechanism 110 (see FIG. 8) performs predetermined operation so as to exhibit a force-enhancing effect. The operation between the lower pressing mechanism 140 and the lower cam 85 is the same as the above-described operation.

In such a fold-enhancing mechanism 80, the recording-medium bundle PB is located in an area (in the ±H direction) where the two guide grooves 91 and 92 of the upper cam 84 do not exist. Therefore, in this exemplary embodiment, the fold-enhancing process is performed from one end of the fold line of the recording-medium bundle PB toward the other end thereof in the up-down direction of the recording-medium bundle PB.

Figure 12:
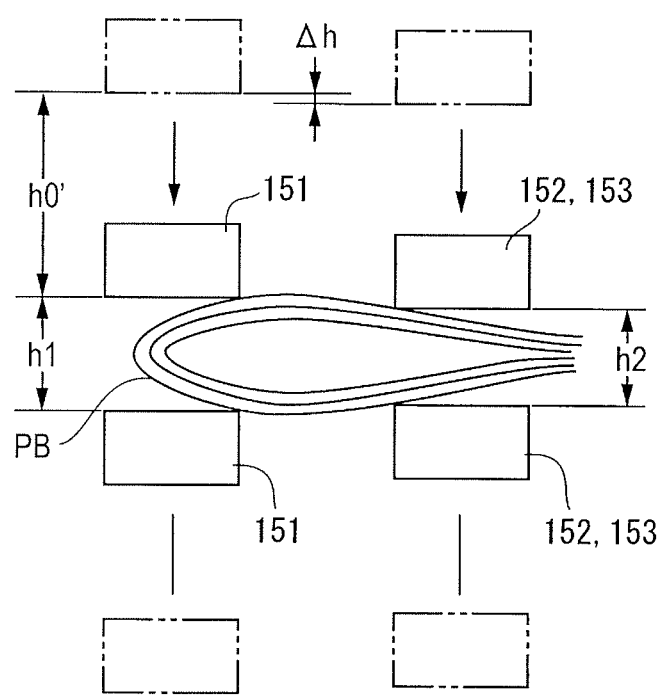
FIG. 12 illustrates nipping dimensions with which the pressing member and the retaining members according to the first exemplary embodiment nip a recording-medium bundle.

Furthermore, as shown in FIG. 12, in this exemplary embodiment, since the retaining rollers 152 and 153 are disposed at positions (Δh) closer toward the recording-medium bundle PB than the pressing rollers 151, when these rollers 151 to 153 come into contact with the recording-medium bundle PB, the retaining rollers 152 and 153 come into contact with the recording-medium bundle PB deeper than the pressing rollers 151, so that a nipping dimension h2 with which the retaining rollers 152 and 153 nip the recording-medium bundle PB is smaller than a nipping dimension h1 with which the pressing rollers 151 nip the recording-medium bundle PB (h1−h2=Δh). In this case, because the recording-medium bundle PB is securely retained by the retaining rollers 152 and 153, the occurrence of deformation of the recording-medium bundle PB may be suppressed even when the fold-enhancing process is performed by the pressing rollers 151. Moreover, in this exemplary embodiment, since pressure is applied onto the opposite surfaces of the recording-medium bundle PB by the pressing rollers 151 and the retaining rollers 152 and 153 during the fold-enhancing process, strong pressure may be applied onto regions corresponding to the nip regions between the rollers, whereby the fold-enhancing effect may be improved. In FIG. 12, although h0' is substantially equal to the distance h0 by which the guide holder 111 is moved in the +V direction by the upper cam 84 shown in FIG. 11, h0' is shorter by an amount equivalent to the amount by which the spring 114 is compressed as a result of pressing against the recording-medium bundle PB.

In this exemplary embodiment, since the fold-enhancing process is performed on the fold line of the folded recording-medium bundle PB by moving the pressing module 100 in one direction (+H direction), the pressing module 100 may be moved in the reverse direction (−H direction) for the next fold-enhancing process. Therefore, the fold-enhancing operation may be performed efficiently. Furthermore, although a ball-screw configuration is used for the combination of the upper support rod 82 and the upper slider 101 of the moving mechanism 200 in this exemplary embodiment, for example, a rack-and-pinion combination or other known methods may be used as an alternative. Furthermore, although the retaining rollers 152 and 153 are configured to come into contact with the recording-medium bundle PB deeper than the pressing rollers 151 in this exemplary embodiment, these rollers may alternatively be set at the same height. Moreover, a similar configuration may be achieved by varying the diameters of the retaining rollers 152 and 153 and the pressing rollers 151. Furthermore, although the guide pin 112 is configured to move along the lower end surface of the upper cam 84 in the above description, the guide pin 112 may alternatively be configured to move along a guide groove that is provided in the upper cam 84 and that corresponds to the lower end surface, instead of moving along the lower end surface of the upper cam 84.

Second Exemplary Embodiment

Figure 13:
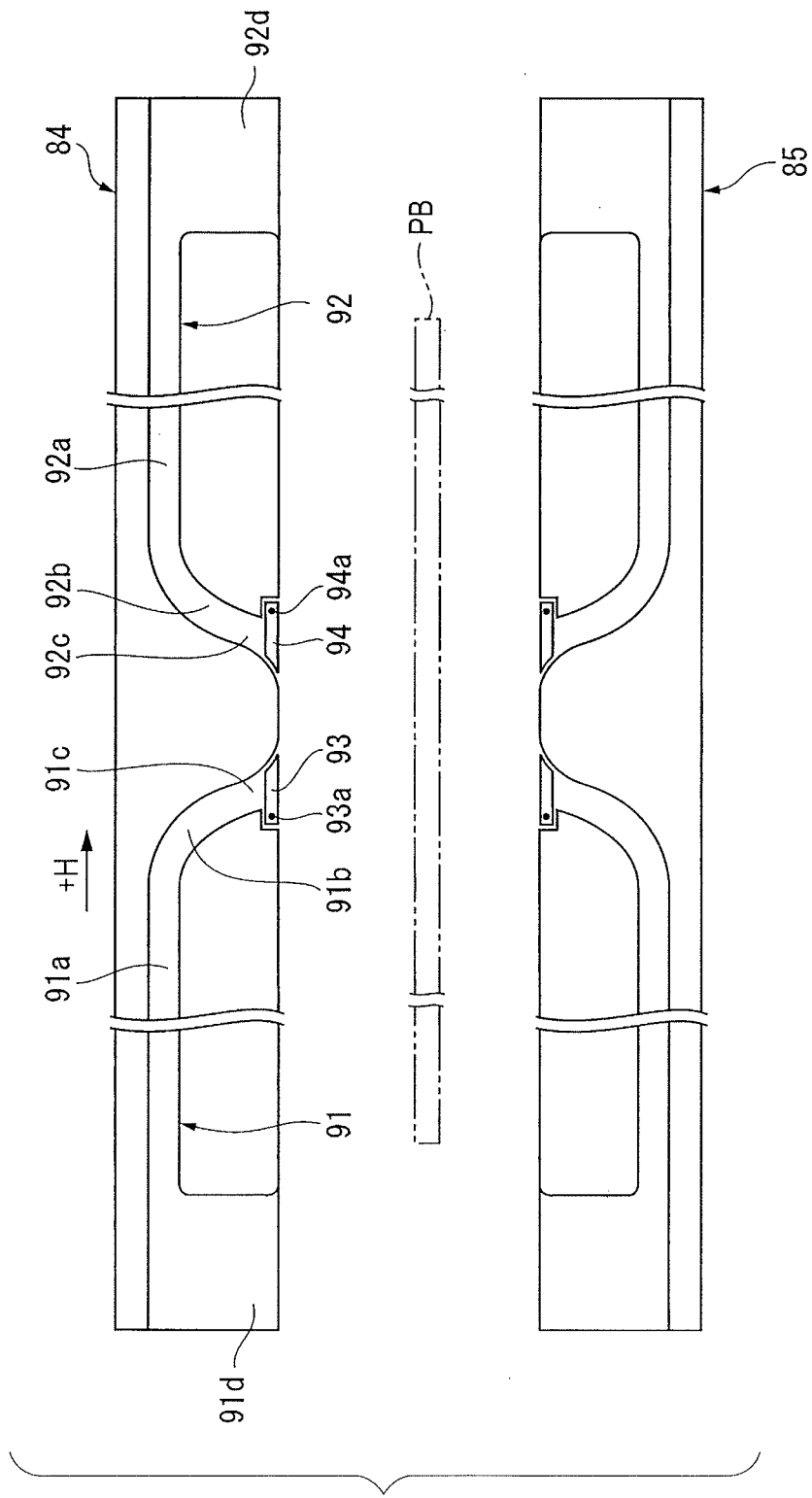
FIG. 13 illustrates a fold-enhancing mechanism according to a second exemplary embodiment.

FIG. 13 illustrates a part of a fold-enhancing mechanism according to a second exemplary embodiment. The fold-enhancing mechanism according to this exemplary embodiment has a configuration similar to that of the fold-enhancing mechanism according to the first exemplary embodiment (see FIG. 8) but is different from the first exemplary embodiment in terms of the shapes of the cams. Therefore, the cams will be described first. Components similar to those in the first exemplary embodiment will be given the same reference characters, and descriptions of such components will be omitted.

In FIG. 13, since the upper cam 84 and the lower cam 85 in this exemplary embodiment have identical configurations with vertically-inverted orientations, the upper cam 84 will be described here. The upper cam 84 has a guide groove 91 having a long linear portion 91a extending from a position located slightly inward from the longitudinal end of the guide groove 91. The linear portion 91a extends substantially to near the center of the upper cam 84. The guide groove 91 has a curve portion 91b at the tip of the linear portion 91a, and also has an end 91c at the tip of the curve portion 91b. The guide groove 91 is also provided with a switching claw 93 that blocks the guide groove 91, such that the end 91c is not open at the lower end surface of the upper cam 84. The switching claw 93 has a pivot shaft 93a that is disposed outside the extension line of the curve portion 91b of the guide groove 91 and that pivotably supports the switching claw 93. The switching claw 93 is biased toward the guide groove 91 by a bias member (not shown), such as a coil spring or a leaf spring, so that the guide groove 91 is blocked by the switching claw 93. Moreover, a return portion 91d that connects and returns to the linear portion 91a from the lower end surface of the upper cam 84 is provided in front of the linear portion 91a of the guide groove 91 (i.e., at the longitudinal end of the upper cam 84).

The upper cam 84 also has a guide groove 92 disposed symmetrically relative to the guide groove 91. Similar to the guide groove 91, the guide groove 92 also has a long linear portion 92a, a curve portion 92b, and an end 92c. At the end 92c, a switching claw 94 is pivotable about a pivot shaft 94a. Moreover, the guide groove 92 is similarly provided with a return portion 92d.

Figure 14:
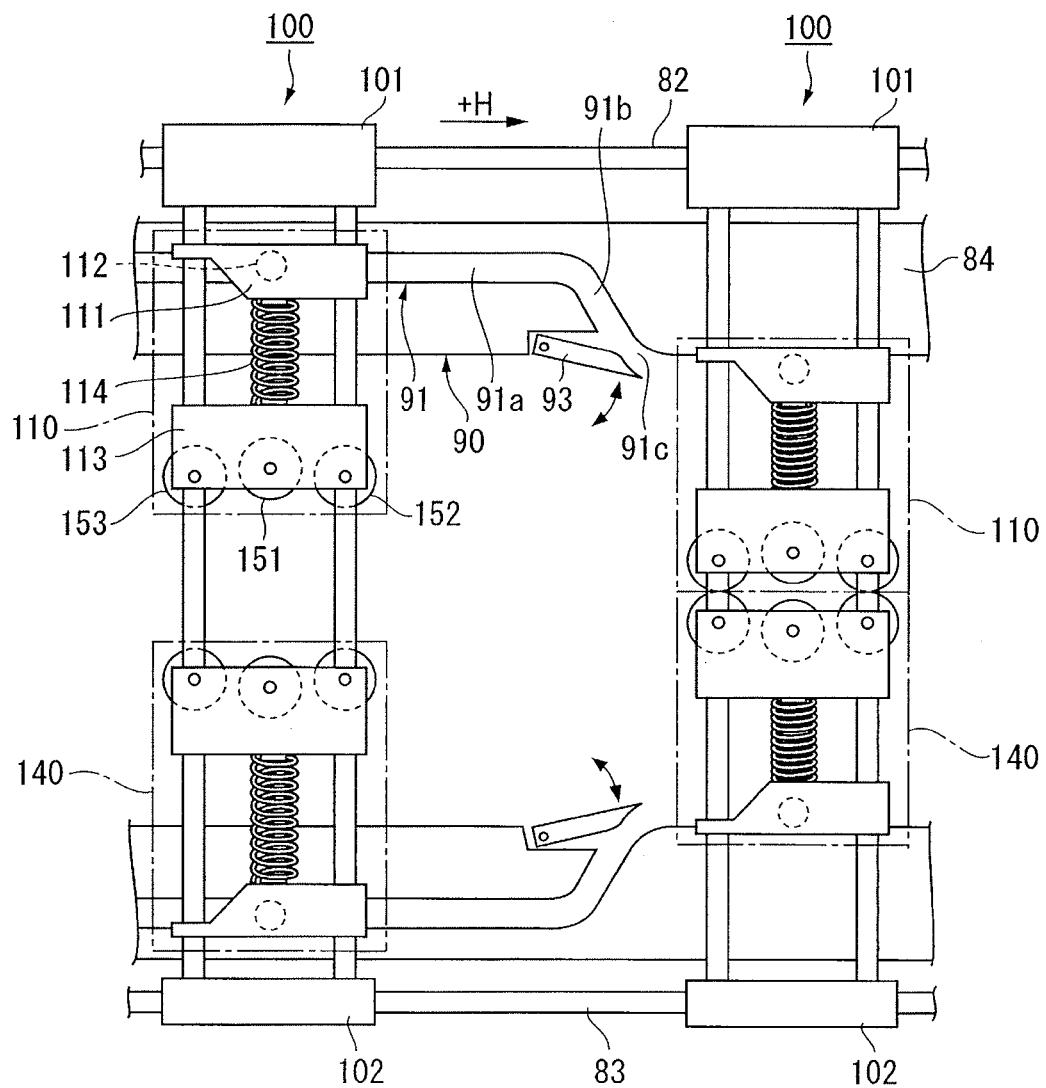
FIG. 14 illustrates how a pressing module according to the second exemplary embodiment changes.

FIG. 14 illustrates how the pressing module 100 according to this exemplary embodiment changes. Specifically, FIG. 14 illustrates how the upper pressing mechanism 110 and the lower pressing mechanism 140 change when the upper slider 101 moves. When the upper slider 101 moves along the upper support rod 82 in the +H direction and the guide pin 112 reaches the end 91c from the curve portion 91b of the guide groove 91, the switching claw 93 is rotated in a direction indicated by an arrow by the guide pin 112, thereby opening the end 91c of the guide groove 91. Subsequently, the guide pin 112 moves from the guide groove 91 to a position along the lower end surface of the upper cam 84. Thus, the pressing rollers 151 and the retaining rollers 152 and 153 of the upper pressing mechanism 110 and the lower pressing mechanism 140 come into contact with a recording-medium bundle PB (not shown), so that the fold-enhancing process is performed thereon. Although FIG. 14 illustrates a state where the switching claw 93 is opened, the switching claw 93 is normally closed by the bias member (not shown).

Next, the movement of the pressing module 100 according to this exemplary embodiment will be described with reference to FIGS. 13 and 14. In FIGS. 13 and 14, it is assumed that the standby position of the guide pin 112 is located in the return portion 91d of the guide groove 91. As the pressing module 100 moves in the +H direction, the guide pin 112 sequentially travels through the linear portion 91a, the curve portion 91b, and the end 91c. Then, the switching claw 93 is opened by being pushed by the guide pin 112, so that the guide pin 112 reaches the lower end surface of the upper cam 84. From this point, the fold-enhancing process commences on the fold line of the recording-medium bundle PB. Then, when the guide pin 112 reaches the return portion 92d of the guide groove 92 after traveling continuously along the lower end surface of the upper cam 84, the guide pin 112 returns toward the linear portion 92a. Subsequently, when the pressing module 100 moves in the −H direction from this state, the guide pin 112 moves sequentially through the linear portion 92a, the curve portion 92b, and the end 92c of the guide groove 92 and opens the switching claw 94. Then, the guide pin 112 reaches the lower end surface of the upper cam 84. From this point, the fold-enhancing process commences again on the fold line of the recording-medium bundle PB.

In other words, in this exemplary embodiment, the pressing module 100 is moved back and forth in the ±H direction so that, after performing the fold-enhancing process substantially from near the center of the recording-medium bundle PB toward the end thereof in the +H direction, the fold-enhancing process is performed again on a part of the recording-medium bundle PB that has not undergone the fold-enhancing process yet, starting from near the center of the recording-medium bundle PB toward the other end thereof in the −H direction. Accordingly, when the fold-enhancing process is performed on the recording-medium bundle PB, the pressing rollers 151 and the retaining rollers 152 and 153 entirely come into contact with the recording-medium bundle PB, so that the occurrence of deformation of the recording-medium bundle PB during the fold-enhancing process may be further suppressed. Moreover, operation for making the rollers run upon the recording-medium bundle PB may also be not necessary when performing the fold-enhancing process.

Third Exemplary Embodiment

FIG. 15 illustrates a fold-enhancing mechanism according to a third exemplary embodiment. The fold-enhancing mechanism according to this exemplary embodiment has a configuration similar to that of the fold-enhancing mechanism according to the first exemplary embodiment (see FIG. 8) but is different from the first exemplary embodiment in that the pressing module 100 includes the upper pressing mechanism 110 alone. Furthermore, in this exemplary embodiment, a stationary member 87 is provided at a position facing the recording-medium bundle PB for performing the fold-enhancing process on the recording-medium bundle PB, such that the fold-enhancing process is performed between the upper pressing mechanism 110 and the stationary member 87. Components similar to those in the first exemplary embodiment will be given the same reference characters, and descriptions of such components will be omitted.

In this exemplary embodiment, as the pressing module 100 moves in the +H direction, the guide holder 111 moves so as to cause the roller holder 113 to move in the +V direction. Therefore, the fold-enhancing process is performed on the recording-medium bundle PB between the pressing roller 151 and the retaining rollers 152 and 153, which are attached to the roller holder 113, and the stationary member 87. Thus, the fold-enhancing process is performed on the recording-medium bundle PB from one end toward the other end of the recording-medium bundle PB in the up-down direction thereof.

In this exemplary embodiment, the following configuration is also possible.

For example, a linear groove extending from the guide groove 92 and connecting to the guide groove 91 may be provided, and a switching claw (similar to the switching claw 93 shown in FIG. 14) may be provided at a section where this linear groove and the guide groove 91 meet. In this case, assuming that the position of the pressing module 100 in FIG. 15 is the standby position, the pressing roller 151 and the retaining rollers 152 and 153 may be brought into contact with the recording-medium bundle PB when the pressing module 100 moves in the +H direction, and the pressing roller 151 and so on may be returned to the standby position in a state where they are not in contact with the recording-medium bundle PB when the pressing module 100 moves in the −H direction. Such a configuration is also possible in the first exemplary embodiment.

Although the guide grooves 91 and 92 of the upper cam 84 in this exemplary embodiment are substantially similar to those in the first exemplary embodiment (see FIG. 8), the guide grooves 91 and 92 of the upper cam 84 may alternatively be similar to those in the second exemplary embodiment (see FIG. 13). In this case, the fold-enhancing process is performed on the recording-medium bundle PB from near the center of the recording-medium bundle PB toward one end thereof in the +H direction, and is performed again from near the center toward the other end in the −H direction.

Fourth Exemplary Embodiment

Figure 16A:
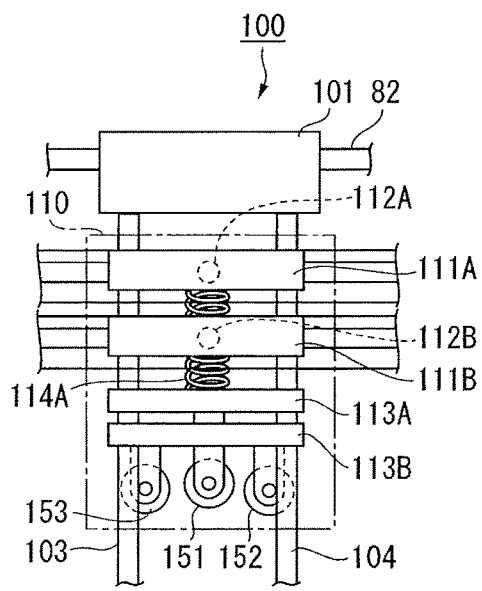
FIGS. 16A to 16C illustrate a fold-enhancing mechanism according to a fourth exemplary embodiment.
Figure 16B:
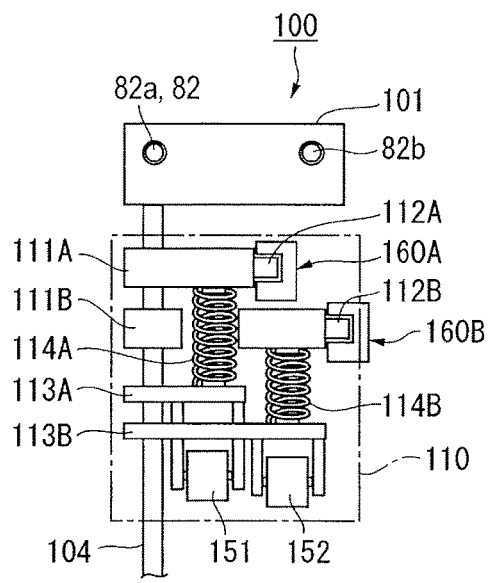
Figure 16C:
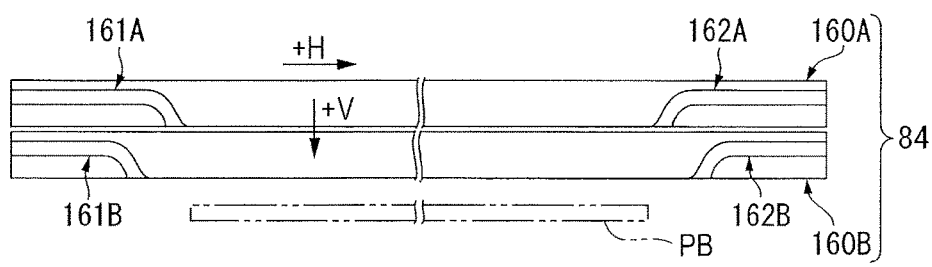

FIGS. 16A to 16C illustrate a fold-enhancing mechanism according to a fourth exemplary embodiment. Specifically, FIGS. 16A and 16B illustrate a part of the pressing module 100, and FIG. 16C illustrates the upper cam 84. The pressing module 100 according to this exemplary embodiment is different from that in the first exemplary embodiment in that the guide holder 111 and the roller holder 113 are each divided into two parts. Although the pressing module 100 is similar to that in the first exemplary embodiment (see FIG. 8) in having the upper pressing mechanism 110 and the lower pressing mechanism 140, only the upper pressing mechanism 110 is illustrated. Moreover, FIG. 16B is a side view of FIG. 16A. Components similar to those in the first exemplary embodiment will be given the same reference characters, and descriptions of such components will be omitted.

The upper pressing mechanism 110 of the pressing module 100 according to this exemplary embodiment includes a first guide holder 111A, a second guide holder 111B, a first roller holder 113A, and a second roller holder 113B arranged in this order from the upper slider 101 side. The first guide holder 111A is provided with a first guide pin 112A, and the second guide holder 111B is provided with a second guide pin 112B. The first roller holder 113A has the pressing roller 151 attached thereto, and the second roller holder 113B has the retaining rollers 152 and 153 attached thereto. A first spring 114A is provided between the first guide holder 111A and the first roller holder 113A, and a second spring 114B is provided between the second guide holder 111B and the second roller holder 113B.

Furthermore, the upper cam 84 is divided into an upper part and a lower part in the ±V direction. These two parts are a first upper cam 160A disposed closer to the upper slider 101 and a second upper cam 160B disposed farther away from the upper slider 101. With regard to the first upper cam 160A and the second upper cam 160B, the first upper cam 160A is disposed closer to the connection rods 103 and 104, whereas the second upper cam 160B is disposed farther away from the connection rods 103 and 104. The first upper cam 160A and the second upper cam 160B are provided with guide grooves 161A and 162A and guide grooves 161B and 162B, respectively. Of these guide grooves, the guide grooves 161A and 162A of the first upper cam 160A extend further toward the center of the cam in the longitudinal direction than the guide grooves 161B and 162B of the second upper cam 160B. The first guide pin 112A corresponds to the first upper cam 160A, and the second guide pin 112B corresponds to the second upper cam 160B. The recording-medium bundle PB is disposed within the two guide grooves 161A and 162A of the first upper cam 160A.

In this configuration, when the upper slider 101 moves in the +H direction, the second guide pin 112B of the second guide holder 111B first moves in the +V direction, thus causing the second roller holder 113B to move toward the recording-medium bundle PB. Then, the first guide pin 112A of the first guide holder 111A moves in the +V direction. In this case, since the second guide holder 111B has already moved in the +V direction, the second guide holder 111B does not hinder the movement of the first guide pin 112A. In this exemplary embodiment, the pressing roller 151 comes into contact with the recording-medium bundle PB at the timing at which the first guide pin 112A moves in the +V direction. In other words, in this exemplary embodiment, the retaining rollers 152 and 153 first come into contact with the recording-medium bundle PB, and the pressing roller 151 subsequently comes into contact with the recording-medium bundle PB.

As the upper slider 101 advances further in the +H direction, the first guide pin 112A of the first guide holder 111A first moves in the −V direction, thus causing the pressing roller 151 to move away from the recording-medium bundle PB. Subsequently, the second guide pin 112B of the second guide holder 111B moves in the −V direction, thus causing the retaining rollers 152 and 153 to move away from the recording-medium bundle PB.

Figure 17A:
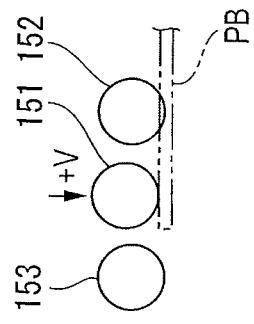
FIGS. 17A to 17F illustrate the movement of a pressing roller and retaining rollers in the fourth exemplary embodiment.
Figure 17B:
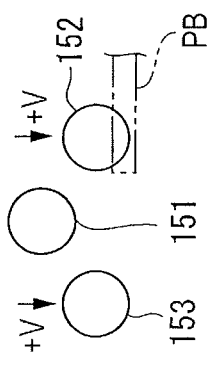
Figure 17C:
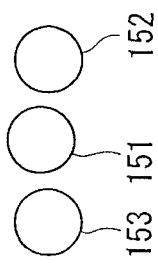
Figure 17D:
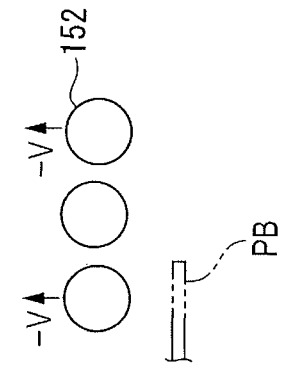
Figure 17E:
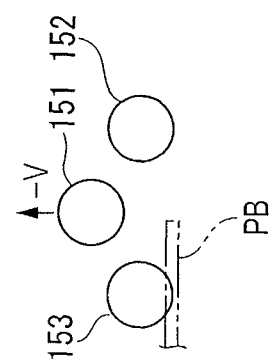
Figure 17F:
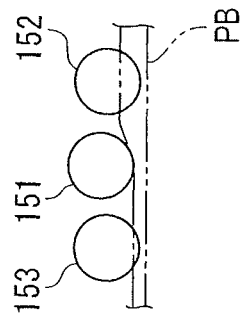

FIGS. 17A to 17F illustrate the movement of the pressing roller 151 and the retaining rollers 152 and 153 according to this exemplary embodiment. Specifically, FIG. 17A illustrates a standby position, and FIG. 17B illustrates the retaining rollers 152 and 153 moving in the +V direction. In this case, although the retaining roller 152 comes into contact with the recording-medium bundle PB, the fold-enhancing process is not yet performed on the fold line thereof. Then, as shown in FIG. 17C, the pressing roller 151 moves in the +V direction, so that the fold-enhancing process commences on the recording-medium bundle PB. Subsequently, as shown in FIG. 17D, the pressing roller 151 sequentially performs the fold-enhancing process on the recording-medium bundle PB. Then, when the pressing roller 151 moves beyond the end of the recording-medium bundle PB as shown in FIG. 17E, the pressing roller 151 moves in the −V direction. As the pressing roller 151 further advances, the retaining rollers 152 and 153 move in the −V direction, so that the fold-enhancing process on the recording-medium bundle PB ends.

When the fold-enhancing process is to be performed on the recording-medium bundle PB in this exemplary embodiment, the retaining rollers 152 and 153 first come into contact with the recording-medium bundle PB so that an area close to the fold line of the recording-medium bundle PB is retained, and the pressing roller 151 subsequently comes into contact with the recording-medium bundle PB. When the pressing roller 151 comes into contact with the recording-medium bundle PB, the occurrence of deformation of the recording-medium bundle PB may be suppressed during the fold-enhancing process by the pressing roller 151 since the recording-medium bundle PB in the vicinity of the pressing roller 151 is pulled toward the retaining rollers 152 and 153.

Although the pressing module 100 includes the upper pressing mechanism 110 and the lower pressing mechanism 140 in this exemplary embodiment, the pressing module 100 may alternatively include the upper pressing mechanism 110 alone, as in the third exemplary embodiment (see FIG. 15). In this case, the fold-enhancing process may be performed between the pressing module 100 and the stationary member 87.

Fifth Exemplary Embodiment

Figure 18A:
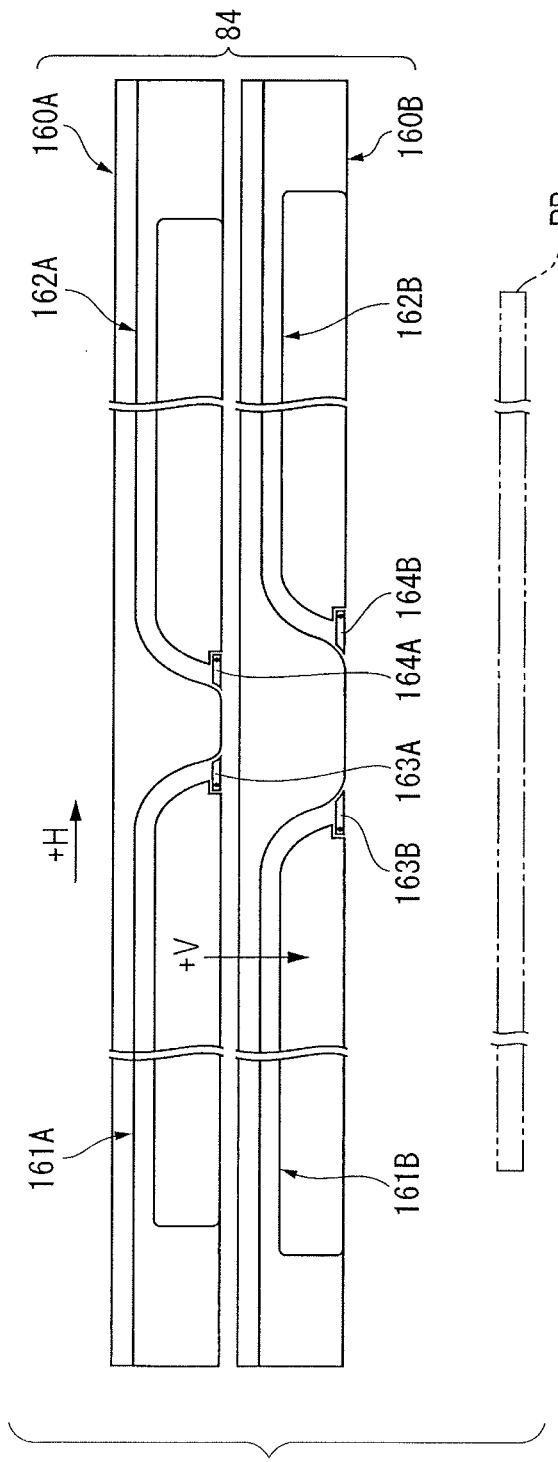
FIG. 18A illustrates a fold-enhancing mechanism according to a fifth exemplary embodiment.
Figure 18B:
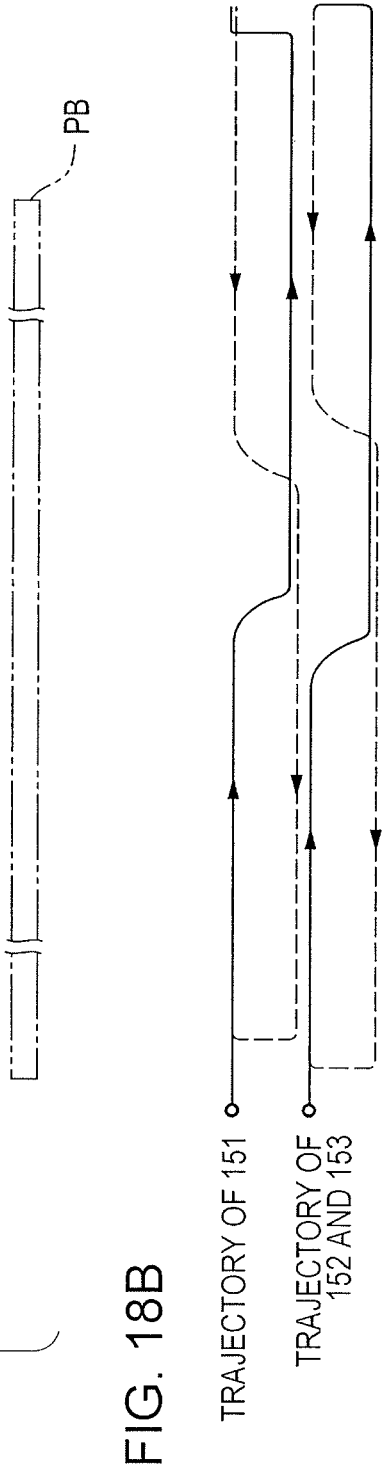
FIG. 18B illustrates the movement trajectories of the pressing roller and the retaining rollers in the fifth exemplary embodiment.

FIG. 18A illustrates an upper cam of a fold-enhancing mechanism according to a fifth exemplary embodiment. The pressing module 100 according to this exemplary embodiment has a configuration similar to that of the pressing module 100 according to the fourth exemplary embodiment (see FIGS. 16A to 16C) but is different from the fourth exemplary embodiment in terms of the shapes of the cams. In FIGS. 18A and 18B, only the shape of the upper cam 84 is shown. Components similar to those in the fourth exemplary embodiment will be given the same reference characters, and descriptions of such components will be omitted.

In FIGS. 18A and 18B, the first upper cam 160A is provided with guide grooves 161A and 162A, and these guide grooves 161A and 162A are provided with switching claws 163A and 164A, respectively. The second upper cam 160B is provided with guide grooves 161B and 162B, and these guide grooves 161B and 162B are provided with switching claws 163B and 164B, respectively. The switching claws 163A and 164A of the first upper cam 160A are disposed inward of the switching claws 163B and 164B of the second upper cam 160B in the longitudinal direction of the cams.

FIG. 18B illustrates the movement trajectories of the pressing roller 151 and the two retaining rollers 152 and 153 in this exemplary embodiment, starting from origin points (standby positions) indicated by circles. In FIG. 18B, a part where each trajectory descends in the +V direction indicates that the corresponding roller is in contact with the recording-medium bundle PB. In other words, the retaining rollers 152 and 153 come into contact with the recording-medium bundle PB prior to the pressing roller 151, and the pressing roller 151 moves away from the recording-medium bundle PB prior to the retaining rollers 152 and 153.

By employing this configuration, a state where the pressing roller 151 performs the fold-enhancing process on the recording-medium bundle PB while the recording-medium bundle PB is retained by the retaining rollers 152 and 153 is maintained, so that the occurrence of wrinkles may be suppressed during the fold-enhancing process. Although the above description relates to a case where the pressing rollers 151 and the retaining rollers 152 and 153 are disposed at opposite surfaces of the recording-medium bundle PB to perform the fold-enhancing process, a stationary member 87 may be disposed at a position facing the recording-medium bundle PB at one surface of the recording-medium bundle PB, as in the third exemplary embodiment (see FIG. 15).

Modification

In the fourth and fifth exemplary embodiments, two cams are used as the upper cam (see FIGS. 16A to 16C and FIGS. 18A and 18B). Alternatively, the rollers may be moved individually by using three cams as the upper cam.

FIGS. 19A and 19B illustrate the movement trajectories of the pressing roller 151 and the two retaining rollers 152 and 153 when the upper cam includes three cams. Specifically, FIG. 19A illustrates a case where the fold-enhancing process commences from an end of the recording-medium bundle PB, as in the first exemplary embodiment. FIG. 19B illustrates a case where the fold-enhancing process commences from near the center of the recording-medium bundle PB, as in the second exemplary embodiment. In FIG. 19B, the solid lines and the dashed lines indicate that the rollers sequentially move from the solid lines toward the dashed lines.

FIG. 19A illustrates the following operation. The retaining roller 152 first moves in the +V direction so as to come into contact with the recording-medium bundle PB, and the retaining roller 153 then moves in the +V direction so as to come into contact with the recording-medium bundle PB. Then, the pressing roller 151 finally moves in the +V direction so as to come into contact with the recording-medium bundle PB, thereby commencing the fold-enhancing process. Subsequently, after the pressing roller 151 reaches the end of the recording-medium bundle PB, the pressing roller 151 first moves in the −V direction so as to move away from the recording-medium bundle PB. Then, the retaining roller 153 moves in the −V direction, and the retaining roller 152 finally moves in the −V direction.

FIG. 19B illustrates the following operation. The retaining roller 152 first moves in the +V direction near the center of the recording-medium bundle PB so as to come into contact with the recording-medium bundle PB, and the retaining roller 153 then moves in the +V direction near the center of the recording-medium bundle PB so as to come into contact with the recording-medium bundle PB. Then, in a state where the recording-medium bundle PB is retained by the two retaining rollers 152 and 153, the pressing roller 151 moves in the +V direction near the center of the recording-medium bundle PB, thereby commencing the fold-enhancing process. Subsequently, after the fold-enhancing process is performed to the end of the recording-medium bundle PB, the pressing roller 151 first moves in the −V direction, and then the retaining roller 153 and the retaining roller 152 move in the −V direction in that order. Then, in order to perform the fold-enhancing process on a part of the recording-medium bundle PB that has not undergone the fold-enhancing process yet, the retaining roller 152, the retaining roller 153, and the pressing roller 151 move in the −H direction. In this case, the movement trajectories formed are similar to those formed when the rollers moved in +H direction, so that the fold-enhancing process is performed on the entire recording-medium bundle PB.

Sixth Exemplary Embodiment

Figure 20:
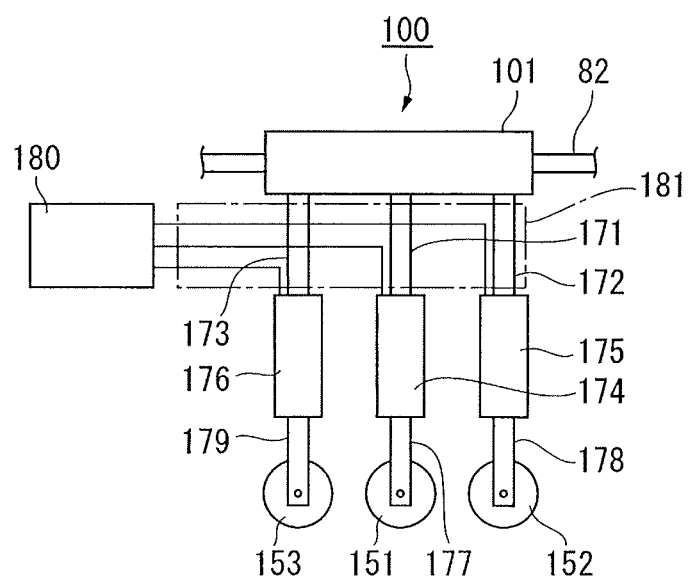
FIG. 20 illustrates a pressing module according to a sixth exemplary embodiment.

FIG. 20 schematically illustrates a pressing module according to a sixth exemplary embodiment. The pressing module according to this exemplary embodiment is different from the pressing modules described above in that the pressing roller 151 and the retaining rollers 152 and 153 are moved electrically.

In the pressing module 100 according to this exemplary embodiment, the upper slider 101 is provided with three stationary support members 171 to 173. The support members 171 to 173 have plungers 174 to 176 respectively attached thereto. The plungers 174 to 176 have movable portions 177 to 179 respectively attached thereto, which are movable in the vertical direction in FIG. 20. Furthermore, these movable portions 177 to 179 have rollers attached thereto. The movable portion 177 rotatably supports the pressing roller 151. The movable portion 178 rotatably supports the retaining roller 152. The movable portion 179 rotatably supports the retaining roller 153. Moreover, the plungers 174 to 176 are connected to electric wires for moving the plungers, and these electric wires are connected to a control circuit 180. In FIG. 20, reference character 181 denotes, for example, a ribbon cable that holds the electric wires together and that is movable in conformity to the movement of the upper slider 101.

In this exemplary embodiment, the control circuit 180 is capable of individually moving the pressing roller 151 and the retaining rollers 152 and 153 in accordance with the movement of the upper slider 101. For example, when performing the fold-enhancing process from one end of the recording-medium bundle PB, the retaining roller 152 covering over the recording-medium bundle PB is first brought into contact with the recording-medium bundle PB, the pressing roller 151 is then brought into contact with the recording-medium bundle PB, and the remaining retaining roller 153 is brought into contact with the recording-medium bundle PB when the retaining roller 153 reaches a position above the recording-medium bundle PB. When the fold-enhancing process reaches the other end of the recording-medium bundle PB, the rollers may be lifted upward in accordance with the order in which the rollers move away from the recording-medium bundle PB.

Furthermore, when performing the fold-enhancing process from the central region of the recording-medium bundle PB, the retaining roller 152 and the retaining roller 153 may be substantially simultaneously brought into contact with the recording-medium bundle PB, and the pressing roller 151 may subsequently be brought into contact with the recording-medium bundle PB.

Although the plungers are used here, a different combination, such as solenoids, magnetic members, or springs, is also possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fold-enhancing device comprising:
a pressing member configured to press against a fold line of a recording-medium bundle folded into a booklet shape, the recording-medium bundle being obtained by stacking a plurality of sheets of recording media;
at least one retaining member configured to retain the recording-medium bundle, the retaining member further configured to be provided in direct contact with the recording-medium bundle at a position located away from the fold line in a direction intersecting the fold line and not in contact with the pressing member; and
a moving mechanism configured to move the pressing member and the retaining member in a direction extending along the fold line.

2. The fold-enhancing device according to claim 1, wherein the retaining member includes a plurality of retaining members that are separated from each other in the direction extending along the fold line with respect to a center of the pressing member.

3. The fold-enhancing device according to claim 1, wherein the retaining member includes a plurality of retaining members that are symmetrically arranged with respect to a center of the pressing member in the direction extending along the fold line.

4. The fold-enhancing device according to claim 1, wherein the pressing member and the retaining member respectively include a plurality of pressing members and a plurality of retaining members that are symmetrically provided with the recording-medium bundle interposed therebetween.

5. The fold-enhancing device according to claim 1, wherein the pressing member is further configured to press against the recording-medium bundle with a nipping dimension that is larger than a nipping dimension with which the retaining member nips the recording-medium bundle.

6. The fold-enhancing device according to claim 1, wherein the pressing member is further configured to come into contact with the recording-medium bundle after the retaining member comes into contact with the recording-medium bundle.

7. The fold-enhancing device according to claim 1, wherein the moving mechanism has a contact-noncontact mechanism configured to move the pressing member and the retaining member into contact with and away from the recording-medium bundle in a thickness direction of the recording-medium bundle, and
wherein the contact-noncontact mechanism is further configured to integrally move the pressing member and the retaining member, and wherein in a case in which the pressing member and the retaining member come into contact with the recording-medium bundle, the retaining member is positioned such that a nipping dimension with which the retaining member nips the recording-medium bundle is smaller than a nipping dimension with which the pressing member nips the recording-medium bundle.

8. The fold-enhancing device according to claim 7, wherein the moving mechanism is further configured to use the contact-noncontact mechanism to move the pressing member and the retaining member into contact with a central region of the recording-medium bundle in the direction extending along the fold line, then to move the pressing member and the retaining member to a first end of the recording-medium bundle in the direction extending along the fold line, to subsequently return the pressing member and the retaining member to the central region in a state where the pressing member and the retaining member are disposed out of contact with the recording-medium bundle by the contact-noncontact mechanism, then to use the contact-noncontact mechanism to move the pressing member and the retaining member into contact with the recording-medium bundle again, and to move the pressing member and the retaining member to a second end of the fold line.

9. The fold-enhancing device according to claim 7, wherein the moving mechanism is further configured to use the contact-noncontact mechanism to move the pressing member and the retaining member into contact with the recording-medium bundle at a first end of the recording-medium bundle in the direction extending along the fold line, then to move the pressing member and the retaining member to a second end of the recording-medium bundle, and subsequently to use the contact-noncontact mechanism to dispose the pressing member and the retaining member out of contact with the recording-medium bundle.

10. The fold-enhancing device according to claim 1, wherein the moving mechanism has a contact-noncontact mechanism configured to move the pressing member and the retaining member into contact with and away from the recording-medium bundle in a thickness direction of the recording-medium bundle, and
wherein the contact-noncontact mechanism is further configured to cause, in a case in which the pressing member and the retaining member come into contact with the recording-medium bundle, the retaining member to come into contact with the recording-medium bundle prior to the pressure member, and wherein, the contact-noncontact mechanism is further configured to cause, in a case in which the pressing member and the retaining member move away from the recording-medium bundle, the pressing member to move away from the recording-medium bundle prior to the retaining member.

11. A post-processing device comprising:
a folding device configured to stack a plurality of sheets of recording media and to fold the plurality of sheets of recording media into a booklet shape; and
the fold-enhancing device according to claim 1.

12. A processing apparatus comprising:
an image forming unit configured to form an image onto a recording medium; and
the post-processing device according to claim 11.

13. A processing apparatus comprising:
an image forming unit configured to form an image onto a recording medium;
a folding device configured to stack a plurality of sheets of recording media having images formed thereon by the image forming unit and to fold the plurality of sheets of recording media into a booklet shape; and the fold-enhancing device according to claim 1.

14. The fold-enhancing device according to claim 1, wherein the at least one retaining member is further configured to be arranged on the recording-medium bundle further away from the fold line than the pressing member and beyond a length of the pressing member along the recording-medium bundle in the direction intersecting the fold line.

15. The fold-enhancing device according to claim 1, further comprising:

a second retaining member configured to retain the recording-medium bundle, wherein the retaining member and the second retaining member are symmetrically arranged at opposite sides of the pressing member in the direction intersecting the fold line.

16. The fold-enhancing device according to claim 1, wherein the moving mechanism is further configured to move the pressing member and the retaining member along a plurality of guide grooves comprising pivotally-supported switching claws configured to block the guide grooves.

17. The fold-enhancing device according to claim 1, wherein the pressing member is further configured to exert a first force on the recording-medium bundle according to a first spring attached to the pressing member, and the retaining member is further configured to exert a second force on the recording-medium bundle by a second spring, different than the first spring, attached to the retaining member.

18. The fold-enhancing device according to claim 1, wherein the retaining member is configured to retain a wider area of the recording medium bundle than an area that the pressing member is pressing in the direction extending along the fold line.

19. A fold-enhancing device comprising:

a pressing member configured to press against a fold line of a recording-medium bundle folded into a booklet shape, the recording-medium bundle being obtained by stacking a plurality of sheets of recording media;

at least one retaining member being configured to retain the recording-medium bundle, the retaining member being further configured to be provided at a position located away from the fold line in a direction intersecting the fold line and not in contact with the pressing member; and a moving mechanism configured to move the pressing member and the retaining member in a direction extending along the fold line, wherein the retaining member includes a plurality of retaining members that are separated from each other in the direction extending along the fold line with respect to a center of the pressing member.

20. A fold-enhancing device comprising:

a pressing member configured to press against a fold line of a recording-medium bundle folded into a booklet shape, the recording-medium bundle being obtained by stacking a plurality of sheets of recording media;

at least one retaining member configured to retain the recording-medium bundle, the retaining member further configured to be provided at a position located away from the fold line in a direction intersecting the fold line and not in contact with the pressing member; and a moving mechanism configured to move the pressing member and the retaining member in a direction extending along the fold line, wherein the moving mechanism has a contact-noncontact mechanism configured to move the pressing member and the retaining member into contact with and away from the recording-medium bundle in a thickness direction of the recording-medium bundle, and wherein the contact-noncontact mechanism is further configured to cause, in a case in which the pressing member and the retaining member come into contact with the recording-medium bundle, the retaining member to come into contact with the recording-medium bundle prior to the pressure member, and wherein, the contact-noncontact mechanism is further configured to cause, in a case in which the pressing member and the retaining member move away from the recording-medium bundle, the pressing member to move away from the recording-medium bundle prior to the retaining member.

* * * * *